(12) United States Patent
Ogawa et al.

(10) Patent No.: US 12,052,491 B2
(45) Date of Patent: Jul. 30, 2024

(54) ELECTRONIC DEVICE, CONTROL METHOD FOR ELECTRONIC DEVICE, AND NON-TRANSITORY COMPUTER READABLE STORAGE MEDIUM

(71) Applicant: CANON KABUSHIKI KAISHA, Tokyo (JP)

(72) Inventors: Seiji Ogawa, Tokyo (JP); Shin Murakami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 160 days.

(21) Appl. No.: 17/846,754

(22) Filed: Jun. 22, 2022

(65) Prior Publication Data

US 2022/0321770 A1 Oct. 6, 2022

Related U.S. Application Data

(63) Continuation of application No. PCT/JP2020/044911, filed on Dec. 2, 2020.

(30) Foreign Application Priority Data

Dec. 27, 2019 (JP) .................................. 2019-238836
Oct. 20, 2020 (JP) .................................. 2020-176006

(51) Int. Cl.
*H04N 23/62* (2023.01)
*G06F 3/0488* (2022.01)
*H04N 23/67* (2023.01)

(52) U.S. Cl.
CPC ........... *H04N 23/62* (2023.01); *G06F 3/0488* (2013.01); *H04N 23/67* (2023.01)

(58) Field of Classification Search
CPC ............................ G06F 3/018; G06F 3/04842
See application file for complete search history.

(56) References Cited

U.S. PATENT DOCUMENTS 9,952,690 B2 * 4/2018 Taguchi ................... G06F 3/013
11,132,162 B2 * 9/2021 Bar-Zeev ................ G06F 3/017
(Continued)

FOREIGN PATENT DOCUMENTS

CN 105933580 A 9/2016
CN 109074212 A 12/2018
(Continued)

OTHER PUBLICATIONS

The Nov. 23, 2023 Chinese Office Action, a copy of which is enclosed without an English Translation, that issued in Chinese Patent Application No. 202080090239.6.
(Continued)

*Primary Examiner* — Leon W Rhodes, Jr.
(74) *Attorney, Agent, or Firm* — Cowan, Liebowitz & Latman, P.C.

(57) ABSTRACT

An electronic device moves a selected position on a display. In a first case, in which the selected position is specified on a basis of the line-of-sight input but a first operation is not performed to an operation unit, the electronic device displays an item indicating a range of a first size, in a second case, in which the selected position is specified on a basis of the line-of-sight input and the first operation is performed to the operation unit, the electronic device displays an item indicating a range of a second size, which is smaller than the first size, in the first case, an object is selected in response to a second operation on a basis of a predetermined condition, and in the second case, an object is selected in response to the second operation without being on a basis of the predetermined condition.

18 Claims, 16 Drawing Sheets

(56) References Cited

U.S. PATENT DOCUMENTS

| | | | |
|---|---|---|---|
| 11,189,099 B2 * | 11/2021 | Ravasz | ............. G06F 3/013 |
| 2018/0227480 A1 | 8/2018 | Ogawa | |
| 2019/0191101 A1 | 6/2019 | Ogawa | |

FOREIGN PATENT DOCUMENTS

| | | | |
|---|---|---|---|
| CN | 110569750 | A | 12/2019 |
| JP | H08125906 | A | 5/1996 |
| JP | 2012231237 | A | 11/2012 |
| JP | 2014089716 | A | 5/2014 |
| JP | 2014228629 | A | 12/2014 |
| JP | 2015-022208 | A | 2/2015 |
| JP | 2017085214 | A | 5/2017 |
| JP | 2017-103566 | A | 6/2017 |
| JP | 2018-037893 | A | 3/2018 |
| JP | 2019-016906 | A | 1/2019 |
| WO | 2017/014415 | A | 1/2017 |

OTHER PUBLICATIONS

The International Search Report dated Feb. 22, 2021 of International Application No. PCT/JP2020/044911, a copy of which is enclosed.

* cited by examiner

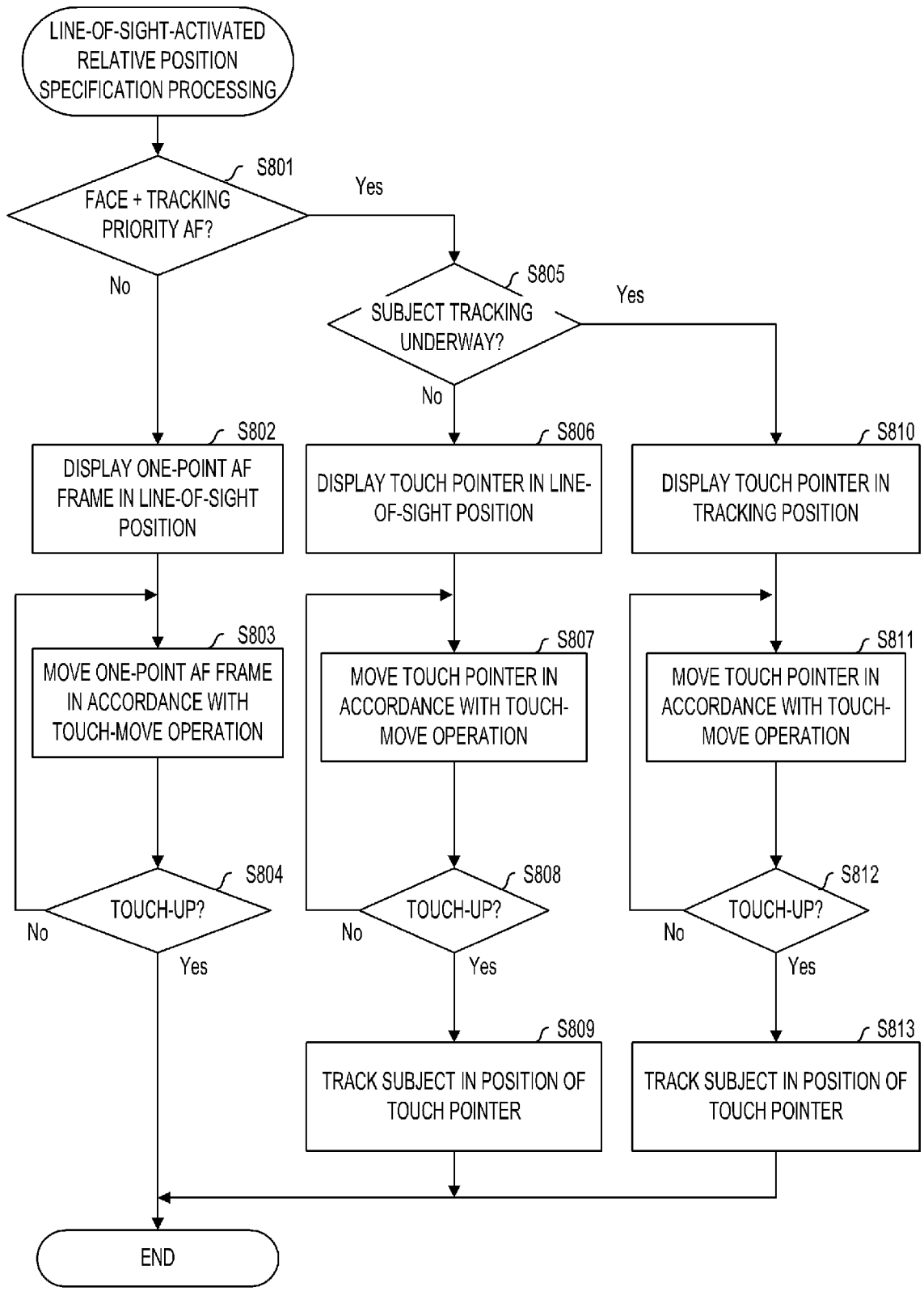

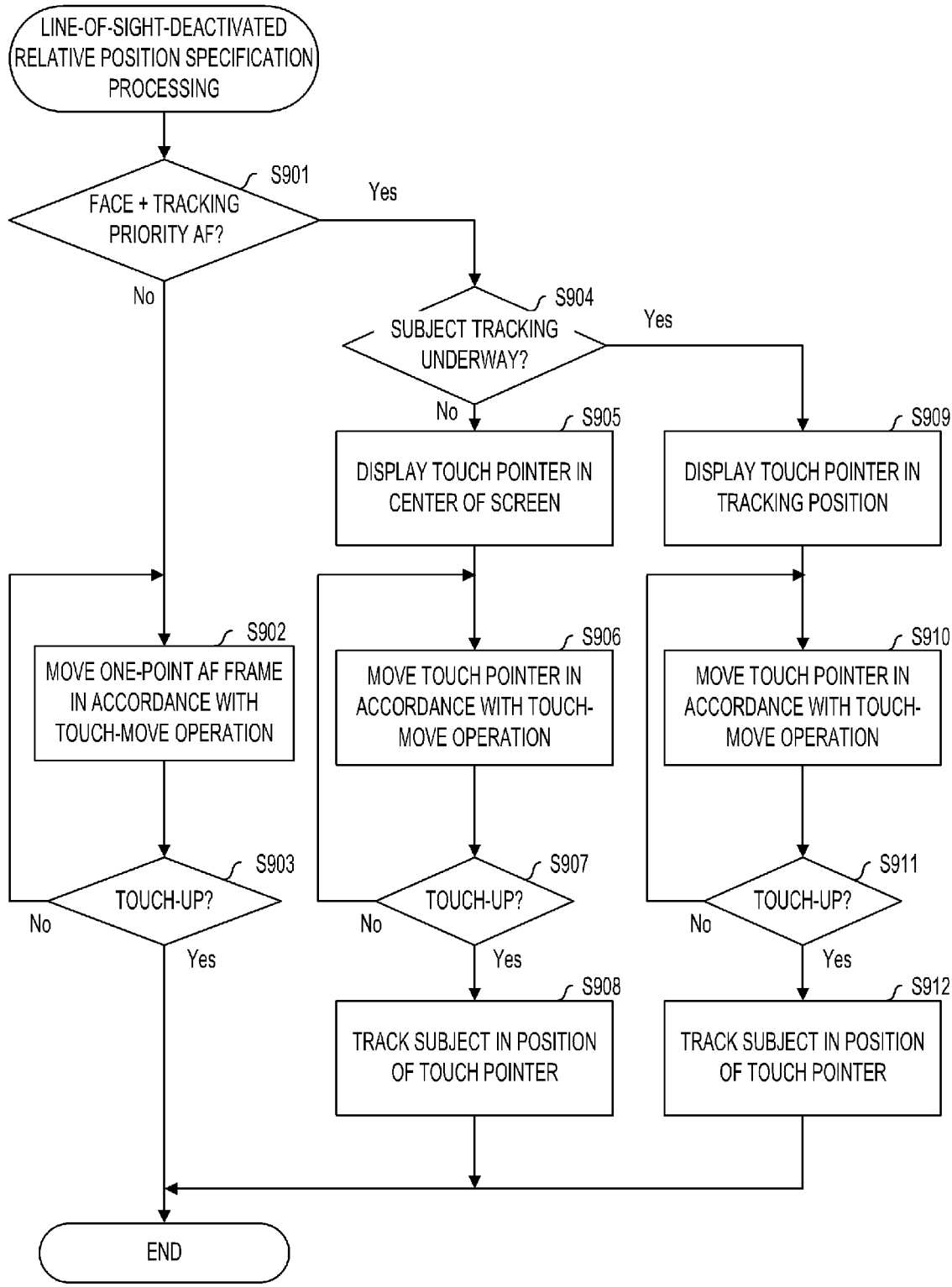

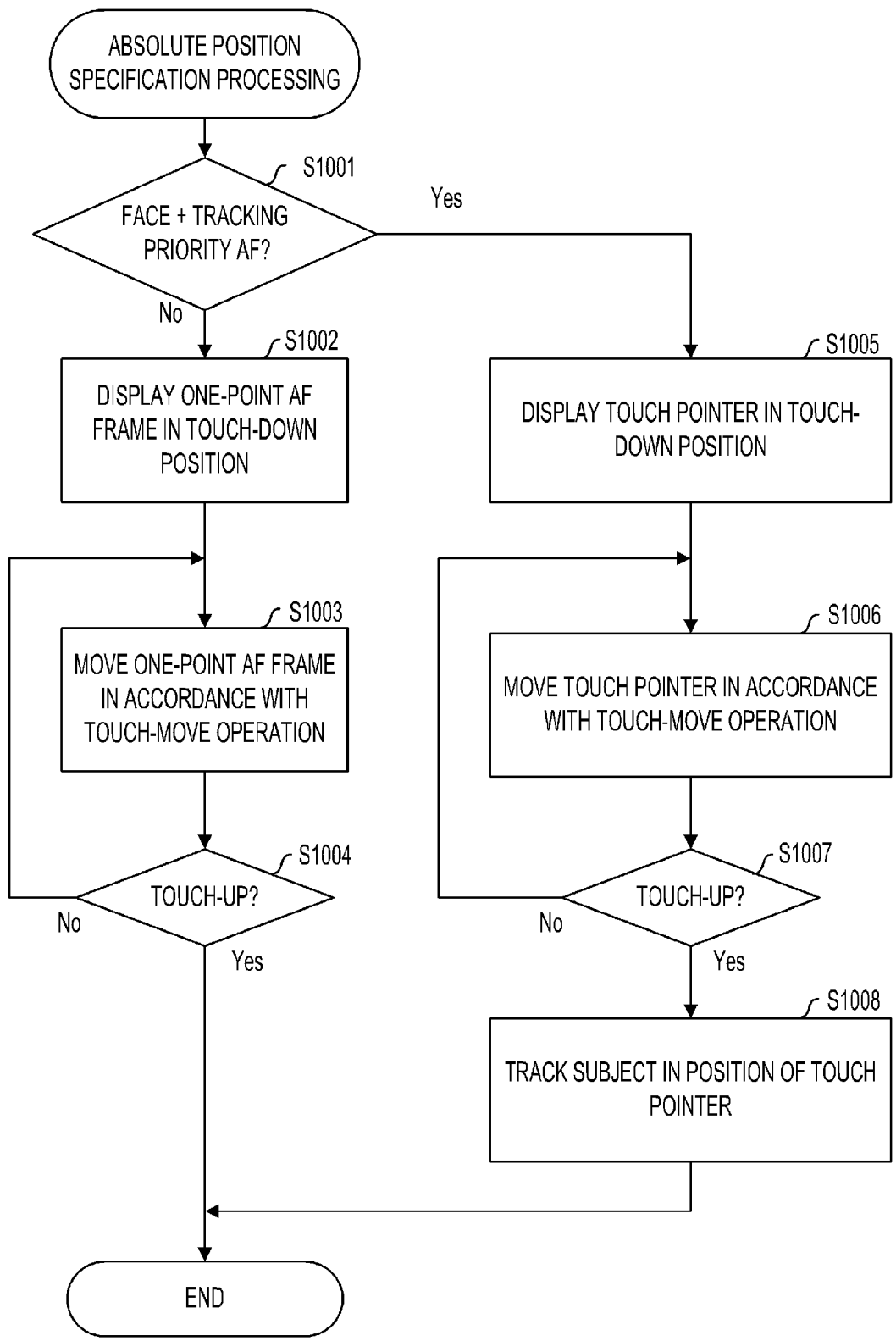

ELECTRONIC DEVICE, CONTROL METHOD FOR ELECTRONIC DEVICE, AND NON-TRANSITORY COMPUTER READABLE STORAGE MEDIUM

CROSS-REFERENCE TO RELATED APPLICATIONS

This application is a Continuation of International Patent Application No. PCT/JP2020/044911, filed Dec. 2, 2020, which claims the benefit of Japanese Patent Application No. 2019-238836, filed Dec. 27, 2019 and Japanese Patent Application No. 2020-176006, filed Oct. 20, 2020, all of which are hereby incorporated by reference herein in their entirety.

BACKGROUND OF THE INVENTION

Field of the Invention

The present invention relates to an electronic device, a control method for an electronic device, and a non-transitory computer readable storage medium.

Background Art

Electronic devices that are operated by the line-of-sight of a user (by line-of-sight input) are available. Line-of-sight input is particularly effective in cases where the user wishes to issue an operation instruction to the electronic device immediately, such as in digital cameras or game machines.

A line-of-sight typically shakes by a large amount, and therefore, in a case where a pointer (a line-of-sight pointer; a GUI) indicating the detection position of the line-of-sight is displayed on a screen, if a small pointer (frame) is displayed, the pointer may shake by a large amount, causing the user to experience a sense of discomfort. When a large pointer (frame) is displayed in a case where a pointer (a GUI) indicating the detection position of the line-of-sight is displayed on the screen, the target subject is more likely to fit into the range of the frame, and therefore the aforesaid sense of discomfort can be reduced. As a result, however, the range is specified roughly, making it difficult to issue an automatic focus adjustment (AF) instruction or a subject tracking instruction in relation to a precise object (subject) in the frame.

As a technique for changing the size of the pointer, PTL 1 discloses a technique in which, when a pointer (a touch pointer) indicating a touch position of a user is superimposed on the vicinity of a detected subject, the size of the touch pointer is modified.

However, in the technique disclosed in PTL 1, the size of the pointer is changed in accordance with the subject, and therefore the size of the pointer may be changed against the wishes of the user.

CITATION LIST

Patent Literature

PTL 1 Japanese Patent Application Publication No. 2018-037893

SUMMARY OF THE INVENTION

Hence, an object of the present invention is to provide a technique with which, when a position is specified using the line-of-sight input of a user, the position intended by the user can easily be specified.

An aspect of the present invention is an electronic device including at least one memory and at least one processor which function as: a reception unit configured to receive line-of-sight input corresponding to a line-of-sight of a user looking at a display unit; and a control unit configured to perform control to move a selected position on the display unit in response to the line-of-sight input or a first operation to an operation unit, wherein the control unit performs control such that in a first case, in which the selected position is specified on a basis of the line-of-sight input but the first operation is not performed to the operation unit, a first item indicating a range of a first size is displayed in the selected position based on the line-of-sight input, in a second case, in which the selected position is specified on a basis of the line-of-sight input and the first operation is performed to the operation unit, a second item indicating a range of a second size, which is smaller than the first size, is displayed in the selected position, in the first case, an object is selected in a position of the first item in response to a second operation, which is different from the first operation, on a basis of a predetermined condition, and in the second case, an object is selected in a position of the second item in response to the second operation without being on a basis of the predetermined condition.

Further features of the present invention will become apparent from the following description of exemplary embodiments with reference to the attached drawings.

BRIEF DESCRIPTION OF THE DRAWINGS

FIG. 8 is a flowchart of line-of-sight-activated relative position specification processing, FIG. 9 is a flowchart of line-of-sight-deactivated relative position specification processing, FIG. 10 is a flowchart of absolute position specification processing.

DESCRIPTION OF THE EMBODIMENTS

Embodiment

<External View of Digital Camera 100>

Figure 1A:
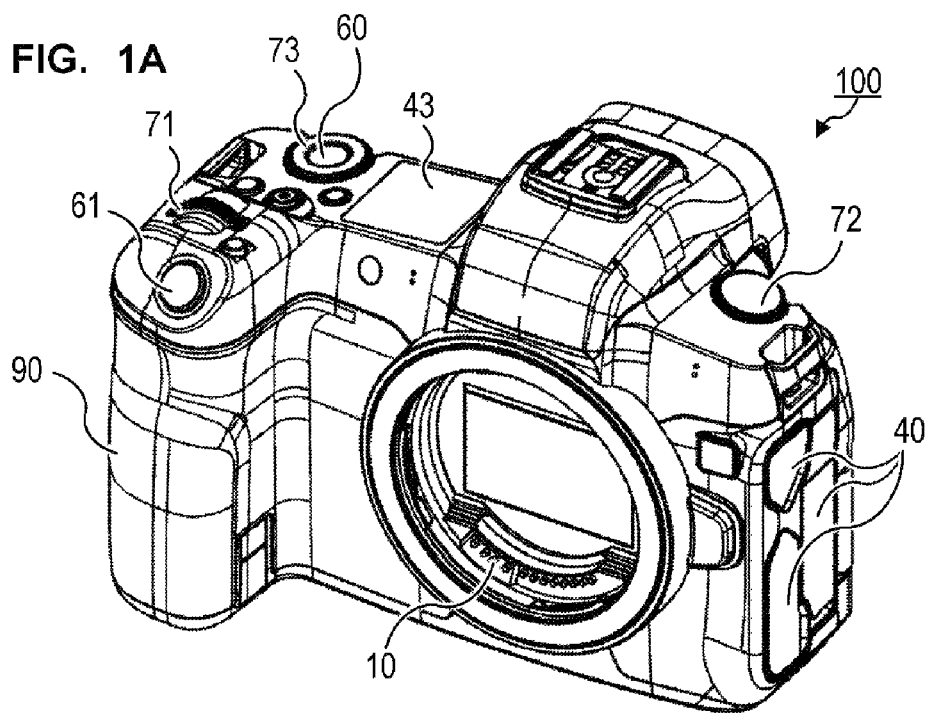
FIGS. 1A and 1B are external views of a digital camera 100.
Figure 1B:
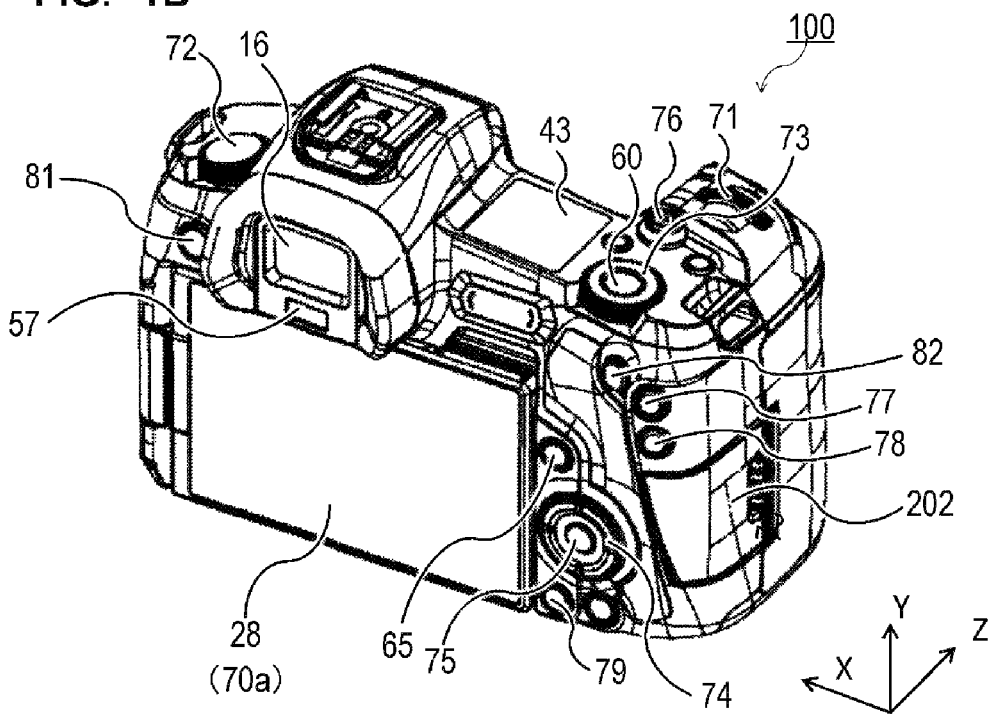

A preferred embodiment of the present invention will be described below with reference to the figures. FIGS. 1A and 1B are external views of a digital camera 100 serving as an example of a device to which the present invention can be applied. FIG. 1A is a front surface perspective view of the digital camera 100, and FIG. 1B is a back surface perspective view of the digital camera 100.

A display unit 28 is a display unit provided on the back surface of the digital camera 100 in order to display images and various information. A touch panel 70a is capable of detecting a touch operation on a display surface (a touch operation surface; a touch operation member) of the display unit 28. A non-viewfinder display unit 43 is a display unit provided on an upper surface of the digital camera 100 in order to display various setting values of the digital camera 100, including the shutter speed and the aperture. A shutter button 61 is an operating member for issuing a shooting instruction (an imaging instruction). A mode switch 60 is an operating member for switching between various modes. A terminal cover 40 is a cover for protecting a connector (not shown) that connects the digital camera 100 to an external device.

A main electronic dial 71 is a rotary operating member, and by rotating the main electronic dial 71, it is possible to modify setting values such as the shutter speed and the aperture, and so on. A power supply switch 72 is an operating member for switching the power supply of the digital camera 100 ON and OFF. A sub-electronic dial 73 is a rotary operating member, and by rotating the sub-electronic dial 73, it is possible to move a selection frame (a cursor), perform image scrolling, and so on. A four-direction key 74 is configured such that upper, lower, left, and right parts thereof can be pressed, whereby processing corresponding to the pressed part of the four-direction key 74 can be performed. A SET button 75 is a pushbutton used mainly to determine a selected item or the like. A multi-controller (MC hereafter) 65 is capable of receiving direction instructions in eight directions and a pressing operation performed on a central part thereof.

A moving image button 76 is used to issue instructions to start and stop moving image shooting (recording). An AE lock button 77 is a pushbutton, and by pressing the AE lock button 77 in a shooting standby state, an exposure state can be fixed. A magnification button 78 is an operation button for switching a magnification mode ON and OFF during live view display (LV display) in a shooting mode. By operating the main electronic dial 71 after switching the magnification mode ON, it is possible to magnify and reduce a live view image (an LV image). In a playback mode, the magnification button 78 functions as an operation button for magnifying a reproduced image and increasing the magnification ratio thereof. A playback button 79 is an operation button for switching between the shooting mode and the playback mode. By pressing the playback button 79 in the shooting mode, it is possible to transition to the playback mode, whereby the most recent image among images recorded in a recording medium 200 (described below) can be displayed on the display unit 28. A menu button 81 is a pushbutton used to perform an instruction operation for displaying a menu screen, and when the menu button 81 is pressed, a menu screen on which various settings can be performed is displayed on the display unit 28. The user can perform various settings intuitively using the menu screen displayed on the display unit 28 and the four-direction key 74, the SET button 75, or the MC 65. A line-of-sight confirmation button 82 is an operating member included in an operation unit 70, and is constituted by a pushbutton for selecting or canceling selection of a subject that is based on the position of a line-of-sight pointer, to be described below. The line-of-sight confirmation button is positioned so that the user can easily operate the button even while looking through the viewfinder (i.e., in a state where the eye of the user has approached an eyepiece portion 16), and is positioned so as to be operable by the thumb of a right hand holding a grip portion 90.

A communication terminal 10 is a communication terminal by which the digital camera 100 communicates with the side of a lens unit 150 (described below; detachable). The eyepiece portion 16 is an eyepiece portion of an eyepiece viewfinder (a look-through viewfinder), and the user can view video displayed on an internal EVF 29 (described below) through the eyepiece portion 16. An eye approach detection unit 57 is an eye approach detection sensor for detecting whether or not the eye of the user (the photographer) has approached the eyepiece portion 16. A lid 202 is a lid for a slot in which the recording medium 200 (described below) is stored. The grip portion 90 is a holding portion shaped so that the user can easily grip the grip portion 90 with the right hand while holding the digital camera 100. The shutter button 61 and the main electronic dial 71 are positioned so as to be operable by the index finger of the right hand in a state where the digital camera 100 is held by gripping the grip portion 90 with the little finger, ring finger, and middle finger of the right hand. Further, the sub-electronic dial 73 and the line-of-sight confirmation button 82 are positioned so as to be operable by the thumb of the right hand in the same state.

<Block Diagram of Configuration of Digital Camera 100>

Figure 2:
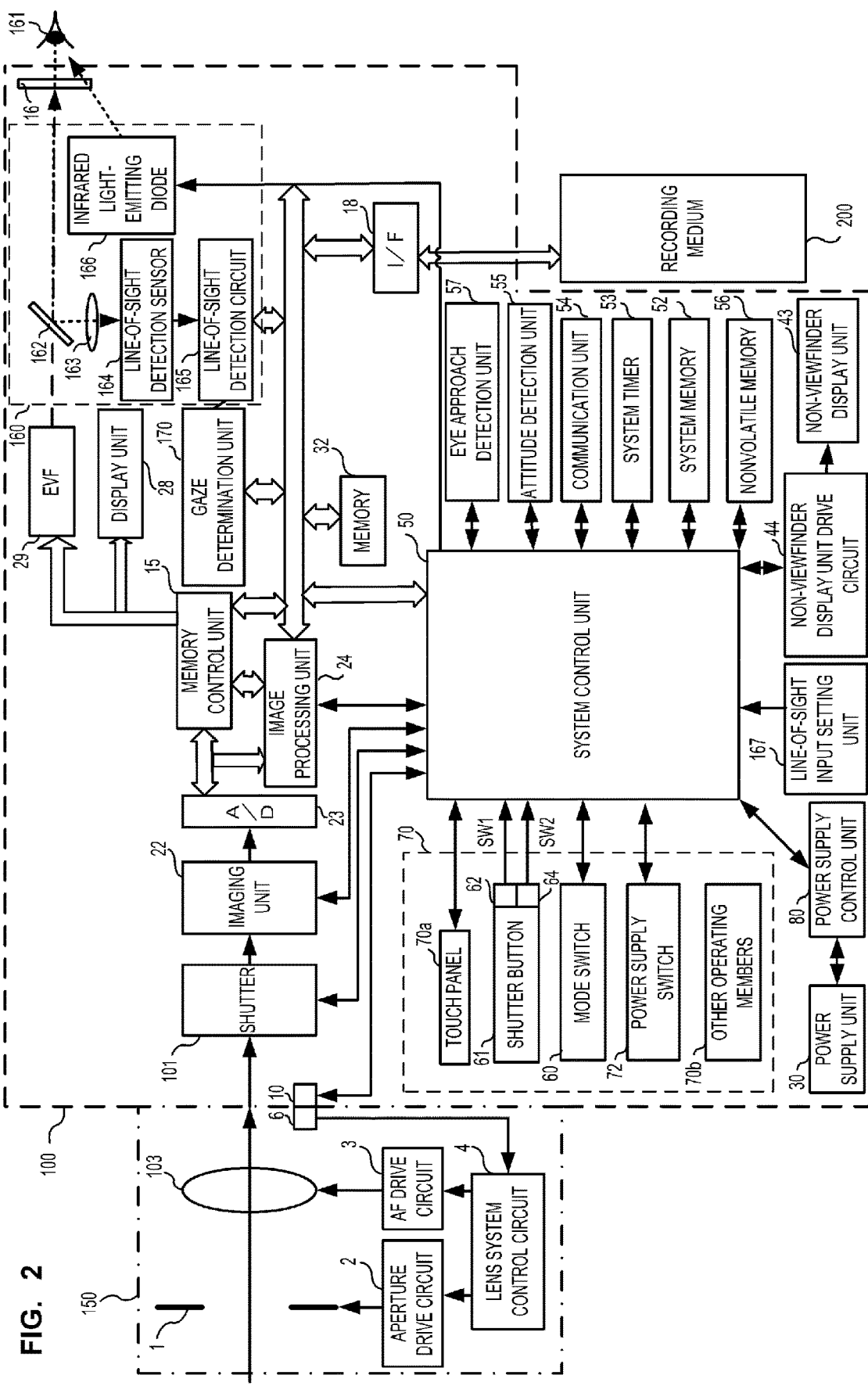
FIG. 2 is a block diagram of the digital camera 100.

FIG. 2 is a block diagram showing an example configuration of the digital camera 100. The lens unit 150 is a lens unit installed with a replaceable shooting lens. A lens 103 is usually constituted by a plurality of lenses, but in FIG. 2, for ease, only one lens is shown. A communication terminal 6 is a communication terminal by which the lens unit 150 communicates with the digital camera 100 side, and a communication terminal 10 is a communication terminal by which the digital camera 100 communicates with the lens unit 150 side. The lens unit 150 communicates with a system control unit 50 through the communication terminals 6, 10. The lens unit 150 controls an aperture 1 via an aperture drive circuit 2 using an internal lens system control circuit 4. Further, the lens unit 150 focuses the lens 103 by displacing the lens 103 via an AF drive circuit 3 using the lens system control circuit 4.

A shutter 101 is a focal plane shutter with which the exposure time of an imaging unit 22 can be freely controlled under the control of the system control unit 50.

The imaging unit 22 is an image sensor constituted by a CCD, a CMOS element, or the like that converts optical images into electric signals. The imaging unit 22 may also include an imaging plane phase difference sensor that outputs defocus amount information to the system control unit 50.

An image processing unit 24 performs predetermined processing (pixel interpolation, resizing processing, i.e., reduction, color conversion processing, and so on) on data from an A/D converter 23 or data from a memory control unit 15. Further, the image processing unit 24 performs predetermined calculation processing using captured image data, whereupon the system control unit 50 performs exposure control and distance measurement control on the basis of the calculation result acquired by the image processing unit 24. Thus, TTL (through-the-lens) type AF (autofocus) processing, AE (automatic exposure) processing, EF (electronic flash pre-emission) processing, and so on are performed. The image processing unit 24 also performs predetermined calculation processing using the captured image data and performs TTL type AWB (automatic white balance) processing on the basis of the acquired calculation result.

The memory control unit 15 controls data transmission and reception between the A/D converter 23, the image processing unit 24, and a memory 32. Output data from the A/D converter 23 are written to the memory 32 via the image processing unit 24 and the memory control unit 15. Alternatively, the output data from the A/D converter 23 are written to the memory 32 via the memory control unit 15 without passing through the image processing unit 24. The memory 32 stores image data acquired by the imaging unit 22 and converted into digital data by the A/D converter 23, and image data to be displayed on the display unit 28 or the EVF 29. The memory 32 has enough storage capacity to store a predetermined number of static images, and moving images and voice of a predetermined length.

The memory 32 also doubles as an image display memory (a video memory). Display image data written to the memory 32 are displayed by the display unit 28 or the EVF 29 via the memory control unit 15. The display unit 28 and the EVF 29 each perform display corresponding to a signal from the memory control unit 15 on a display such as an LCD or an organic EL display. By successively transferring data subjected to A/D conversion by the A/D converter 23 and accumulated in the memory 32 to the display unit 28 or the EVF 29 and displaying the data thereon, live view display (LV) can be performed. An image displayed by live view display will be referred to hereafter as a live view image (an LV image).

The line-of-sight detection unit 160 (a reception unit) detects the line-of-sight of the eye of the user that has approached the eyepiece portion 16 in order to view the EVF 29. The line-of-sight detection unit 160 is constituted by a dichroic mirror 162, an imaging lens 163, a line-of-sight detection sensor 164, a line-of-sight detection circuit 165, and an infrared light-emitting diode 166.

The infrared light-emitting diode 166 is a light-emitting element for detecting the line-of-sight position of the user within the viewfinder screen, and the infrared light-emitting diode 166 emits an infrared beam onto an eyeball (an eye) 161 of the user. The infrared beam emitted by the infrared light-emitting diode 166 is reflected by the eyeball (the eye) 161, whereupon the resulting infrared reflection beam reaches the dichroic mirror 162. The dichroic mirror 162 reflects only infrared light while transmitting visible light. The infrared reflection beam having a modified optical path passes through the imaging lens 163 so as to form an image on an imaging surface of the line-of-sight detection sensor 164. The imaging lens 163 is an optical member constituting a line-of-sight detection optical system. The line-of-sight detection sensor 164 is constituted by an imaging device such as a CCD image sensor.

The line-of-sight detection sensor 164 photoelectrically converts the infrared reflection beam incident thereon into an electric signal and outputs the electric signal to the line-of-sight detection circuit 165. On the basis of an output signal from the line-of-sight detection sensor 164, the line-of-sight detection circuit 165 detects the line-of-sight position of the user from the movement of the eyeball (the eye) 161 of the user and outputs detection information to the system control unit 50 and a gaze determination unit 170.

On the basis of the detection information received from the line-of-sight detection circuit 165, the gaze determination unit 170 determines that when the line-of-sight of the user remains fixed on a certain region for a period exceeding a predetermined threshold, the attention of the user is focused on that region. It may therefore be said that the region is a gaze position (a gaze region) on which the attention of the user is focused. Note that the term "the line-of-sight . . . remains fixed on a certain region" means that, for example, an average position of the movement of the line-of-sight remains within the region until a predetermined period elapses, and variation (variance) therein is smaller than a predetermined value. Note that the predetermined threshold can be modified as desired using the system control unit 50. Further, instead of providing the gaze determination unit 170 as an independent block, the system control unit 50 may be configured to execute an identical function to that of the gaze determination unit 170 on the basis of the detection information received from the line-of-sight detection circuit 165.

In this embodiment, the line-of-sight detection unit 160 detects the line-of-sight using a method known as the corneal reflex method. The corneal reflex method is a method for detecting the orientation/position of a line-of-sight from a positional relationship between a reflection beam generated when the infrared beam emitted from the infrared light-emitting diode 166 is reflected by the eyeball (the eye) 161 (more specifically, the cornea) and the pupil of the eyeball (the eye) 161. Note that there are no particular limitations on the method for detecting the line-of-sight (the orientation/position of the line-of-sight), and a different method to that described above may be used. For example, a method known as the scleral reflection method, which uses the difference in the reflectance of light by the iris and the white of the eye, may also be used.

Various setting values of the camera, including the shutter speed and the aperture, are displayed on the non-viewfinder display unit 43 via a non-viewfinder display unit drive circuit 44.

A nonvolatile memory 56 is an electrically erasable/recordable memory such as a Flash-ROM, for example. Constants for operating the system control unit 50, a program, and so on are recorded in the nonvolatile memory 56. Here, the program is a program for executing various flowcharts of this embodiment, to be described below.

The system control unit 50 is a control unit that is constituted by at least one processor or circuit and performs overall control of the digital camera 100. The system control unit 50 realizes the various processing of this embodiment, to be described below, by executing the aforesaid program recorded in the nonvolatile memory 56. A system memory 52 is a RAM, for example, and the system control unit 50 expands the constants and variables for operating the system control unit 50, the program read from the nonvolatile memory 56, and so on to the system memory 52. The system control unit 50 also performs display control by controlling the memory 32, the display unit 28, and so on.

A system timer 53 is a timing unit for measuring the time used for various types of control and the time on an inbuilt clock.

A power supply control unit 80 is constituted by a switch circuit or the like for switching between a battery detection circuit, a DC-DC converter, and the block to be electrified, and the power supply control unit 80 detects whether or not a battery has been attached, the battery type, the remaining battery charge, and so on. Further, the power supply control unit 80 controls the DC-DC converter on the basis of the detection results acquired thereby and an instruction from the system control unit 50 so as to supply a required voltage to parts including the recording medium 200 for a required period. A power supply unit 30 is constituted by a primary battery such as an alkali battery or a lithium battery, a secondary battery such as an NiCd battery, an NiMH battery, or an Li battery, an AC adapter, or the like.

A recording medium I/F 18 is an interface with the recording medium 200, the recording medium 200 being a memory card, a hard disk, or the like. The recording medium 200 is a recording medium such as a memory card for recording shot images, and is constituted by a semiconductor memory, a magnetic disk, or the like.

A communication unit 54 exchanges video signals and voice signals with an external device connected either wirelessly or by a wire cable. The communication unit 54 can also be connected to a wireless LAN (Local Area Network) or the Internet. The communication unit 54 is also capable of communicating with the external device by Bluetooth (registered trademark) or Bluetooth Low Energy. The communication unit 54 is capable of transmitting the images (including the LV image) shot by the imaging unit 22 and the images recorded in the recording medium 200, and of receiving image data and various other information from the external device.

An attitude detection unit 55 detects the attitude of the digital camera 100 relative to the direction of gravity. On the basis of the attitude detected by the attitude detection unit 55, it is possible to determine whether an image shot by the imaging unit 22 is an image shot while holding the digital camera 100 horizontally or an image shot while holding the digital camera 100 vertically. The system control unit 50 is capable of attaching orientation information corresponding to the attitude detected by the attitude detection unit 55 to an image file of the image shot by the imaging unit 22, and of recording the image after rotating the image. An acceleration sensor, a gyro sensor, or the like can be used as the attitude detection unit 55. Movement of the digital camera 100 (panning, tilting, raising, whether or not the digital camera 100 is stationary, and so on) can also be detected using the acceleration sensor or gyro sensor serving as the attitude detection unit 55.

The eye approach detection unit 57 is an eye approach detection sensor for detecting (approach-detecting) the approach (eye approach) and separation (eye separation) of the eye (an object) 161 to and from the eyepiece portion 16 of the eyepiece viewfinder (referred to simply as the "viewfinder" hereafter). The system control unit 50 switches between display (a display state) and non-display (a non-display state) on the display unit 28 and the EVF 29 in accordance with the state detected by the eye approach detection unit 57. More specifically, in a case where at least the shooting standby state is established and switching of the display destination is set to automatic switching, when the eye has not approached, display is switched ON with the display unit 28 set as the display destination, and the EVF 29 is set at non-display. Further, when the eye has approached, display is switched ON with the EVF 29 set as the display destination, and the display unit 28 is set at non-display. An infrared proximity sensor, for example, may be used as the eye approach detection unit 57, and the eye approach detection unit 57 is capable of detecting the approach of an object of some type toward the eyepiece portion 16 of the viewfinder in which the EVF 29 is installed. When the object approaches, an infrared ray projected from a light projection unit (not shown) of the eye approach detection unit 57 is reflected by the object and received by a light reception unit (not shown) of the infrared proximity sensor. The distance of the object from the eyepiece portion 16 (the eye approach distance) can also be determined from the amount of the infrared ray that is received. Thus, the eye approach detection unit 57 performs eye approach detection for detecting the distance of the object from the eyepiece portion 16. When an object that has approached to within a predetermined distance of the eyepiece portion 16 is detected from a non-eye approach state (a non-approach state), it is assumed that the approach of an eye has been detected. When an object for which approach has been detected separates by at least a predetermined distance from an eye approach state (an approach state), it is assumed that separation of the eye has been detected. A threshold for detecting eye approach and a threshold for detecting eye separation may be set to be different by providing hysteresis or the like, for example. Further, after detecting eye approach, it is assumed that the eye approach state remains established until eye separation is detected. After detecting eye separation, it is assumed that the non-eye approach state remains established until eye approach is detected. Note that an infrared proximity sensor is an example, and any other sensor capable of detecting the approach of an eye or an object assumed to be an approaching eye may be employed as the eye approach detection unit 57.

The system control unit 50 is capable of detecting the following line-of-sight states in relation to the EVF 29 by controlling the line-of-sight detection unit 160.

A line-of-sight that was not oriented toward the EVF 29 is newly oriented toward the EVF 29. In other words, line-of-sight input is started.

A state in which a line-of-sight is being input into the EVF 29 is established.

A state in which attention is focused on a certain position within the EVF 29 is established.

A line-of-sight that was oriented toward the EVF 29 is removed. In other words, line-of-sight input is terminated.

A state in which a line-of-sight is not being input into the EVF 29 (a state in which the EVF 29 is not being viewed) is established.

The system control unit 50 is notified of these operations/states, as well as the position (direction) in which the line-of-sight is oriented toward the EVF 29, via an internal bus, whereupon the system control unit 50 determines, on the basis of the notified information, the type of line-of-sight input that is being performed.

The operation unit 70 is an input unit for receiving operations (user operations) from the user, and is used to input various operation instructions into the system control unit 50. As shown in FIG. 2, the operation unit 70 includes the mode switch 60, the shutter button 61, the power supply switch 72, the touch panel 70*a*, and so on. Further, as other operating members 70*b*, the operation unit 70 includes the main electronic dial 71, the sub-electronic dial 73, the four-direction key 74, the SET button 75, the moving image button 76, the AE lock button 77, the magnification button 78, the playback button 79, the menu button 81, the MC 65, and so on.

The mode switch 60 switches the operating mode of the system control unit 50 to one of a static image shooting mode, a moving image shooting mode, the playback mode, and so on. Modes included in the static image shooting mode include an automatic shooting mode, an automatic scene discrimination mode, a manual mode, an aperture priority mode (an Av mode), a shutter speed priority mode (a Tv mode), and a program AE mode (a P mode). Various scene modes serving as shooting settings for different shooting scenes, a custom mode, and so on are also provided. The user can switch between these modes directly using the mode switch 60. Alternatively, the mode switch 60 may be used to switch to a shooting mode list screen, whereupon another operating member is used to switch selectively to one of a plurality of displayed modes. The moving image shooting mode may likewise include a plurality of modes.

The shutter button 61 includes a first shutter switch 62 and a second shutter switch 64. The first shutter switch 62 is switched ON when the shutter button 61 is half-pressed (a shooting preparation instruction) midway through an operation thereof, whereby a first shutter switch signal SW1 is generated. In response to the first shutter switch signal SW1, the system control unit 50 starts shooting preparation operations such as AF (autofocus) processing, AE (automatic exposure) processing, AWB (automatic white balance) processing, and EF (electronic flash pre-emission) processing. The second shutter switch 64 is switched ON when the shutter button 61 is fully pressed (a shooting instruction) at the end of the operation thereof, whereby a second shutter switch signal SW2 is generated. In response to the second shutter switch signal SW2, the system control unit 50 starts a series of shooting processing operations from reading a signal from the imaging unit 22 to writing a captured image to the recording medium 200 as an image file.

The touch panel 70a and the display unit 28 may be formed integrally. For example, the touch panel 70a is formed so that the light transmittance thereof does not impede the display on the display unit 28 and attached to an upper layer of the display surface of the display unit 28. Input coordinates on the touch panel 70a are then associated with display coordinates on the display surface of the display unit 28. Thus, it is possible to provide a GUI (Graphical User Interface) giving the impression that the user can directly operate the screen displayed on the display unit 28. The system control unit 50 is capable of detecting the following operations or states on the touch panel 70a.

A finger or a pen that has not yet touched the touch panel 70a newly touches the touch panel 70a, or in other words, a touch begins (referred to hereafter as a touch-down).

The finger or pen is in a state of touching the touch panel 70a (referred to hereafter as a touch-on).

The finger or pen is moved while still touching the touch panel 70a (referred to hereafter as a touch-move).

The finger or pen touching the touch panel 70a separates (is released) from the touch panel 70a, or in other words, the touch ends (referred to hereafter as a touch-up).

A state in which nothing is touching the touch panel 70a is established (referred to hereafter as a touch-off).

When a touch-down is detected, a touch-on is detected at the same time. Normally, following a touch-down, a touch-on is detected continuously until a touch-up is detected. Likewise when touch-move is detected, a touch-on is detected at the same time. Even when a touch-on is detected, a touch-move is not detected unless the touch position moves. When it is detected that all touching fingers and pens have performed a touch-up, a touch-off is detected.

The system control unit 50 is notified of these operations and states, as well as the coordinates of the position in which the finger or pen is touching the touch panel 70a, via the internal bus. Then, on the basis of the notified information, the system control unit 50 determines the type of operation (the touch operation) that has been performed on the touch panel 70a. With regard to a touch-move, it is also possible to determine the movement direction in which the finger or pen moves over the touch panel 70a for each vertical component and each horizontal component on the touch panel 70a on the basis of variation in the position coordinates. When a touch-move of at least a predetermined distance is detected, it is determined that a sliding operation has been performed. An operation in which a finger is moved quickly by a certain distance while touching the touch panel 70a and then released is known as a flick. In other words, a flick is an operation for quickly stroking the touch panel 70a with a finger in a flicking motion. When a touch-move of at least a predetermined distance and at least a predetermined speed is detected and a touch-up is detected immediately thereafter, it can be determined that a flick has been performed (it can be determined that a flick has been performed following a sliding operation). Further, a touch operation in which a plurality of locations (two points, for example) are touched together (a multi-touch is performed) and the touch positions are brought closer together is known as a pinch-in, while a touch operation in which the touch positions are moved further away from each other is known as a pinch-out. A pinch-in and a pinch-out are referred to collectively as a pinching operation (or simply as a pinch). The touch panel 70a may be a touch panel using any of various systems, such as a resistive film system, an electrostatic capacitance system, a display acoustic wave system, an infrared system, an electromagnetic induction system, an image recognition system, or an optical sensor system. Either a system that detects contact with the touch panel as a touch or a system that detects the approach of a finger or a pen toward the touch panel as a touch may be used.

Note that the digital camera 100 may also be provided with a voice input unit (not shown) that transmits to the system control unit 50 a voice signal acquired from an inbuilt microphone or a voice input device connected via a voice input terminal. In this case, the system control unit 50 selects the input voice signal as required, performs analog-digital conversion thereon, performs level optimization processing, specific wavelength reduction processing, and so on, and thereby generates a voice signal.

In this embodiment, the user can set either an absolute position specification method or a relative position specification method as a method for specifying the position of the position coordinates (an AF frame, for example) in a case where a touch-move operation is performed in the eye approach state. In the absolute position specification method, the input coordinates on the touch panel 70a are associated with the display coordinates on the display surface of the EVF 29. In the case of the absolute position specification method, when a touch-down is performed on the touch panel 70a, the AF frame is set in (moved from the position prior to the touch-down to) the position associated with the touched position (the coordinate input position) even in the absence of a touch-move. A position set using the absolute position specification method is based on the position of the touch-down, regardless of the position set prior to the touch-down. Further, when a touch-move is performed after the touch-down, the position of the AF frame is also moved on the basis of the touch position following the touch-move. In the relative position specification method, the input coordinates on the touch panel 70a are not associated with the display coordinates on the display surface of the EVF 29. In the case of the relative position specification method, when only a touch-down is performed on the touch panel 70a and a touch-move is not performed, the position of the AF frame is not moved from the position prior to the touch-down. When a touch-move is performed thereafter, the position of the AF frame moves in the movement direction of the touch-move by a distance corresponding to the movement amount of the touch-move from the currently set position of the AF frame (the position set prior to the touch-down) irrespective of the touch-down position.

Note that any of a plurality of AF methods, including "one-point AF" and "face+tracking priority AF", can be set as the AF method (the method for setting the AF frame). "One-point AF" is a method by which the user uses a one-point AF frame to specify one location as the position in which AF is to be performed. "Face+tracking priority AF" is a method by which the AF position is set automatically on the basis of an automatic selection condition in a case where the user has not specified a tracking target. In automatic AF position setting, when a human face is detected from the LV image, the face is selected preferentially as the AF target subject. When a plurality of human faces are detected, one face is selected in accordance with a priority level such as the largest face, the face positioned closest to the digital camera 100 (on the near side), the face positioned closest to the center of the image, or the face of an individual registered in advance, and the selected face is set as the AF target subject. When a human face is not detected, a subject other than a face is selected in accordance with a priority level such as the subject closest to the digital camera 100 (on the near side), the subject with the highest contrast, a subject with a high priority level, such as an animal or a vehicle, or a moving body, and the selected subject is set as the AF target subject. When a subject which is a tracking target has been specified by the user, the subject which is the tracking target subject is set as the AF target subject. In other words, the automatic selection condition is a condition according to which, when weighting is performed using at least one element condition among the example element conditions shown below, the acquired score equals or exceeds a predetermined threshold or the acquired score is the highest.

A detected human face.
The largest face.
The face positioned closest to the digital camera 100 (on the near side).
The face positioned closest to the center of the image.
The face of an individual registered in advance.
The subject closest to the digital camera 100 (on the near side).
The subject with the highest contrast.
A subject with a high priority level, such as an animal or a vehicle.
A moving body.

<AF Frame Setting by Line-of-Sight in One-Point AF>

Using FIGS. 3A to 3F, control for moving the AF frame using line-of-sight input in a case where "one-point AF" has been set in the digital camera 100 as the AF frame selection method (the AF method) will be described. FIGS. 3A to 3F are example displays displayed on the EVF 29 in a case where "one-point AF" has been set as the AF frame selection method (the AF method).

Figure 3A:
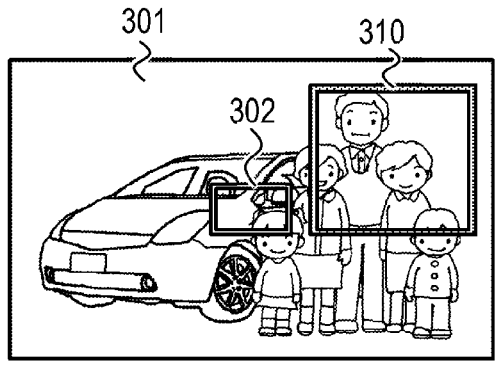
FIGS. 3A to 3F are views illustrating setting of an AF frame by line-of-sight in one-point AF.

FIG. 3A is an example display of a state in which a line-of-sight function (an AF position specification function using line-of-sight input) has been activated and the line-of-sight of the user has been detected by the line-of-sight detection unit 160. A live view (LV hereafter) 301 is an LV image captured by the imaging unit 22. A one-point AF frame 302 is an AF frame (a position serving as the AF target, or in other words an indicator indicating a focus adjustment position) in a case where "one-point AF" has been set as the AF frame selection method (the AF method). In an initial state, the one-point AF frame is set in the center of the screen. A line-of-sight pointer 310 is a pointer (an indicator, a display item, a first item) indicating the position of the line-of-sight input detected by the line-of-sight detection unit 160. The line-of-sight detection unit 160 is capable of acquiring the coordinates of a certain single point as the position in which line-of-sight input is being performed, while the line-of-sight pointer 310 is displayed so as to indicate a range of a predetermined size having a certain magnitude and centering on the position in which line-of-sight input is being performed. Thus, even when the position detected in accordance with the line-of-sight input does not precisely match the position of the target subject that the user wishes to select, the target subject can be contained within the range indicated by the line-of-sight pointer. In other words, a position can be specified roughly by means of line-of-sight input. Further, the line-of-sight pointer 310 is displayed so as to center on a position acquired by averaging the line-of-sight position detected by the line-of-sight detection unit 160 over a predetermined period (a period of 30 milliseconds, for example). Thus, excessive movement of the line-of-sight pointer caused by fluctuations occurring in the position of the line-of-sight input of the user over a very short period of time can be prevented, and as a result, the visibility of the line-of-sight pointer can be improved. A human line-of-sight has a characteristic known as fixational eye movements, in which the eyeball makes small movements even when focused on a certain single point. Therefore, when an attempt is made to specify a precise position using only line-of-sight input, it is difficult to specify the position intended by the user, and as a result, the user experiences a sense of discomfort during the operation. However, by displaying the line-of-sight pointer 310 at a first size having a certain magnitude on the basis of a position averaged over a predetermined period, this sense of discomfort can be reduced.

Figure 3D:
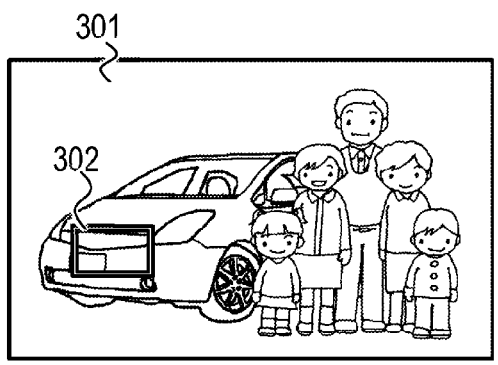
Figure 3B:
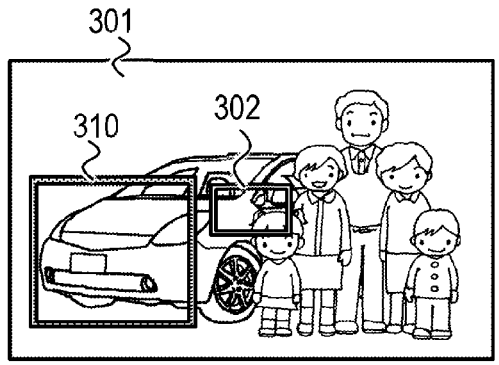

FIG. 3B is an example display on the EVF 29 in a case where the user moves their line-of-sight from the state shown in FIG. 3A so as to change the location of the EVF 29 at which the user is looking. In FIG. 3A, the line-of-sight pointer 310 is in the upper right of the screen, whereas in FIG. 3B, the line-of-sight pointer 310 has moved to the lower left of the screen. Thus, the position of the line-of-sight pointer 310 moves in conjunction with the movement of the line-of-sight of the user. Note that the one-point AF frame 302 does not move simply because the line-of-sight pointer 310 has moved. In other words, the position of the one-point AF frame 302 is the same in FIG. 3A and FIG. 3B.

Figure 3E:
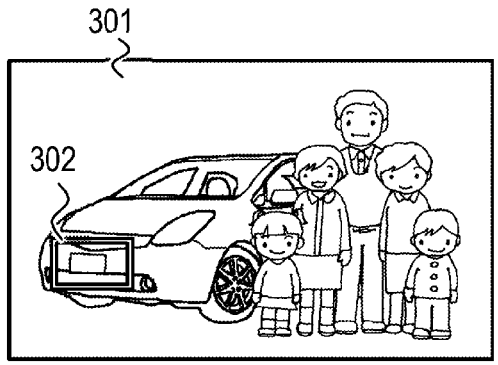
Figure 3C:
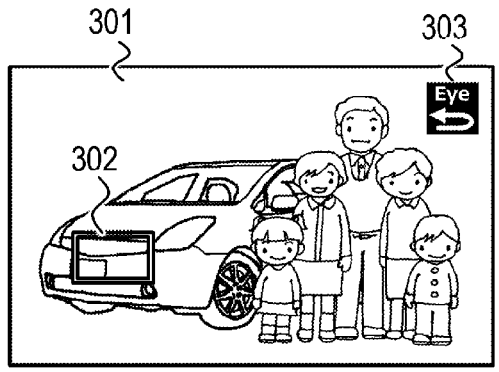

FIG. 3C is an example display on the EVF 29 in a case where the line-of-sight confirmation button 82 has been pressed in the state shown in FIG. 3B. When the line-of-sight confirmation button 82 is pressed in a state where the line-of-sight pointer 310 is displayed, the one-point AF frame 302 is set in (moved to) the line-of-sight input position (a position acquired by averaging the position detected by the line-of-sight detection unit 160 over a predetermined period) at that point in time. When the line-of-sight pointer 310 is not touching an end portion of the screen, the line-of-sight pointer 310 is displayed in a range centering on the line-of-sight input position, and therefore the one-point AF frame is displayed in the center of the position of the line-of-sight pointer 310. Further, a state in which specification of a position by means of line-of-sight has been confirmed is established, and the line-of-sight pointer 310 is no longer displayed. Thus, the position in which to perform AF can be moved on the basis of the position of the line-of-sight input. An icon 303 is an icon indicating that when the AF frame is moved again on the basis of line-of-sight input, it will be necessary to cancel that state in which specification of a position by means of line-of-sight has been confirmed and indicating an operation method for canceling the state. A character string "Eye" denotes the line-of-sight confirmation button 82 and indicates that by pressing the line-of-sight confirmation button 82, the confirmation state can be canceled. When the line-of-sight confirmation button 82 is pressed from the state shown in FIG. 3C, the confirmation state is canceled, whereupon the display state returns to that of FIG. 3A or 3B.

FIG. 3D is an example display in a case where a touch-down on the touch panel 70a has been detected from the state shown in FIG. 3B. When a touch-down is performed in a state where the line-of-sight pointer 310 is displayed, the one-point AF frame 302 is set in (moved to) the line-of-sight input position (a position acquired by averaging the position detected by the line-of-sight detection unit 160 over a predetermined period) at that point in time. Thus, a state in which the AF frame can be moved using a touch-and-drag AF function (a state midway through movement of the AF frame using a touch-and-drag AF function) is established. The touch-and-drag AF function is a function for moving the AF frame displayed on the EVF 29 by performing a touch-move on the touch panel 70a in a different position to the EVF 29. By performing a touch operation, the user can specify the desired position accurately, and therefore, when a pointer (in this example, the one-point AF frame 302 itself) indicating the touch position is large, it becomes difficult to specify a position precisely, which is troublesome. Hence, a large pointer such as the line-of-sight pointer 310 is set at non-display, and a state in which position specification is performed using the one-point AF frame 302, which is smaller than the line-of-sight pointer 310, is established.

FIG. 3E is an example display in a case where a downward and leftward touch-move on the touch panel 70a is detected from the state shown in FIG. 3D, and the one-point AF frame 302 is moved downward and leftward in accordance with the detected touch-move using relative position specification.

Figure 3F:
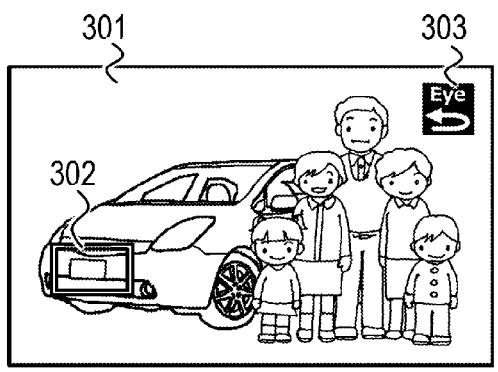

FIG. 3F is an example display in a case where a touch-up has been performed from the state shown in FIG. 3E. In this state, movement of the one-point AF frame 302 by means of touch-and-drag is complete, and the icon 303 is displayed. Thus, the position (the selected position) of the AF frame can be specified by a combination of line-of-sight input and a touch operation. Note that by further touching the touch panel 70a and performing a touch-move thereon from the state shown in FIG. 3F or 3C, the one-point AF frame 302 can be moved further in accordance with the touch-move.

In the examples described above, it is assumed that the position on which the user wishes to focus is a numberplate of an automobile (the subject) included in the LV image 301. In this case, the one-point AF frame 302 can be set in the position of the numberplate as follows. First, by looking at the front part of the automobile on the LV image 301, the front part of the automobile is specified quickly and roughly by the line-of-sight pointer 310, as shown in FIG. 3B. Next, by moving and thereby finely adjusting the position of the one-point AF frame 302 (the position of the one-point AF frame 302 in FIG. 3D), which has been set on the basis of the line-of-sight pointer 310, by means of a touch operation, the position of the one-point AF frame 302 can be accurately aligned with the position of the numberplate. As regards the movement amount of the touch-move performed at this time, since the one-point AF frame 302 has already been set in the vicinity of the numberplate on the basis of the line-of-sight input and the movement amount is an amount therefrom, a small movement amount is sufficient. Hence, according to this embodiment, the user can specify a desired position quickly and accurately.

<AF Frame Setting by Line-of-Sight in Face+Tracking Priority AF>

Using FIGS. 4A to 4G, control for moving the AF frame using line-of-sight input in a case where "face+tracking priority" has been set in the digital camera 100 as the AF frame selection method (the AF method) will be described. FIGS. 4A to 4G are example displays displayed on the EVF 29 in a case where "face+tracking priority" has been set as the AF frame selection method (the AF method).

Figure 4A:
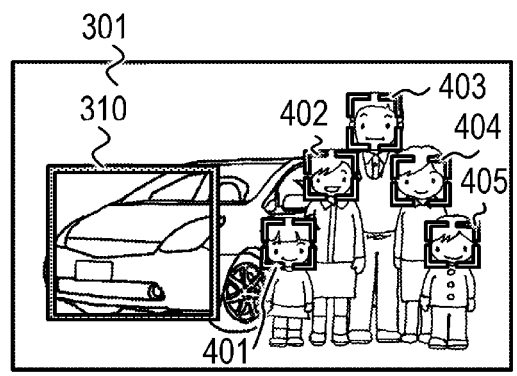
FIGS. 4A to 4G are views illustrating setting of the AF frame by line-of-sight in face+tracking priority AF.

FIG. 4A is an example display in a state in which the line-of-sight function has been activated and the line-of-sight of the user has been detected by the line-of-sight detection unit 160. Identical parts to those described using FIG. 3A have been allocated identical reference numerals, and description thereof has been omitted. Likewise with face+tracking priority, similarly to one-point AF, the line-of-sight pointer 310 is displayed at a first size having a certain magnitude on the basis of a position averaged over a predetermined period. Face frames 401-405 are indicators indicating positions of human faces detected from the LV image. In the state shown in FIG. 4A, no face has been selected.

Figure 4B:
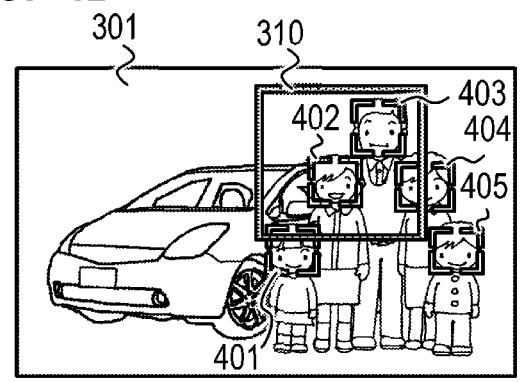

FIG. 4B is an example display on the EVF 29 in a case where the user moves their line-of-sight from the state shown in FIG. 4A so as to change the location of the EVF 29 at which the user is looking. In FIG. 4A, the line-of-sight pointer 310 is on the left side of the screen, but in FIG. 4B, the line-of-sight pointer 310 has moved to the upper right of the screen.

Figure 4C:
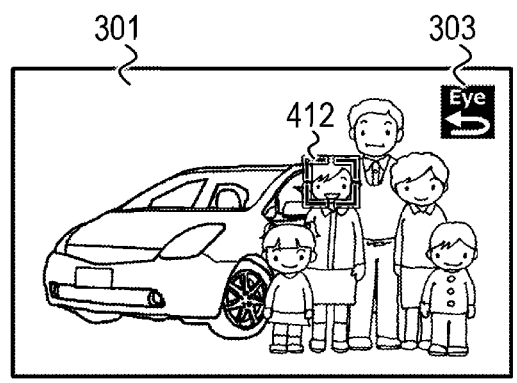

FIG. 4C is an example display on the EVF 29 in a case where the line-of-sight confirmation button 82 has been pressed in the state shown in FIG. 4B. When the line-of-sight confirmation button 82 is pressed in a state where the line-of-sight pointer 310 is displayed, the subject as the tracking target (also the AF target) is selected automatically in accordance with the automatic selection condition, described above, within the range indicated by the line-of-sight pointer 310 at that point in time. In the example of FIG. 4C, the face indicated by the face frame 402, which is the face closest to the near side among the faces (the face frame 402 and the face frame 403) that are entirely included within the line-of-sight pointer 310 shown in FIG. 4B, is selected and set as the tracking target. A tracking frame 412 is displayed on the subject which is the tracking target, and the face frame is no longer displayed. Tracking is then started. During tracking, when the subject which is the tracking target moves, the tracking frame moves in conjunction with the tracking target. Since the subject selection zone is narrowed down by the line-of-sight pointer 310, a subject outside of the line-of-sight pointer 310 is not selected, and therefore the faces indicated by the face frame 401 and the face frame 405 and the automobile are not selected. In other words, the tracking target is set from within a range specified quickly and roughly by the user by means of line-of-sight, and as a result, a subject that is more closely aligned with the intentions of the user can be selected in comparison with automatic selection not using line-of-sight. Further, in FIG. 4C, a state in which specification of a position by means of line-of-sight has been confirmed is established, and the line-of-sight pointer 310 is no longer displayed. When the line-of-sight confirmation button 82 is pressed from the state shown in FIG. 4C, the confirmation state is canceled, whereupon the display state returns to that of FIG. 4A or 4B.

Figure 4D:
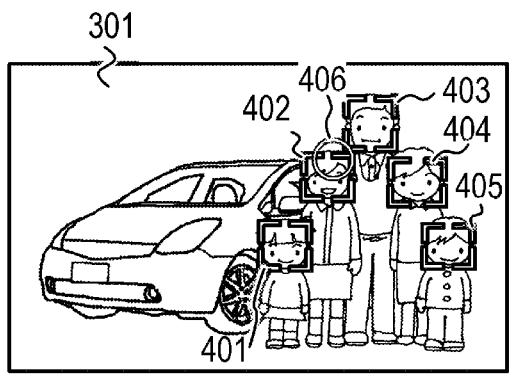

FIG. 4D is an example display in a case where a touch-down on the touch panel 70a has been detected from the state shown in FIG. 4B. When a touch-down is performed in a state where the line-of-sight pointer 310 is displayed, a touch pointer 406 is displayed in the line-of-sight input position (a position acquired by averaging the position detected by the line-of-sight detection unit 160 over a predetermined period) at that point in time. Thus, a state in which position specification can be performed using the touch-and-drag AF function (a state midway through movement of the touch pointer 406 using the touch-and-drag AF function) is established. By performing a touch operation, the user can specify the desired position accurately, and therefore, when the pointer (in this example, the touch pointer 406) indicating the touch position is large, it becomes difficult to specify a position precisely, which is troublesome. Hence, a large pointer such as the line-of-sight pointer 310 is set at non-display, and a state in which position specification is performed using the touch pointer 406, which is smaller than the line-of-sight pointer 310, is established. As a result, even when faces are crowded together, as shown in the figure, the user can select a desired face easily.

Figure 4F:
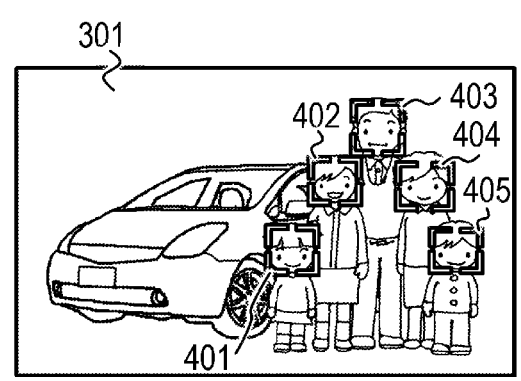
Figure 4E:
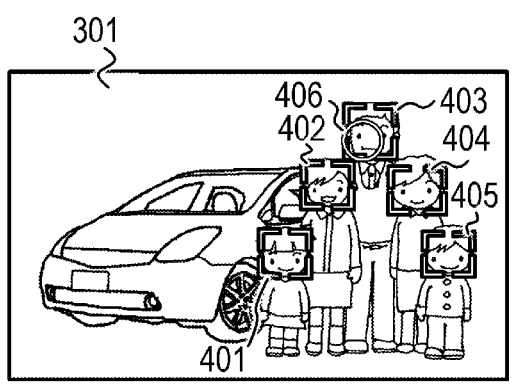

FIG. 4E is an example display in a case where an upward and rightward touch-move on the touch panel 70a is detected from the state shown in FIG. 4D, and the touch pointer 406 is moved upward and rightward in accordance with the detected touch-move using relative position specification. The touch pointer 406 is set in a position substantially matching the position of the face frame 403 (more precisely, a position in which the center of the touch pointer 406 is included within the range of the face frame 403). When a touch-up is performed in this state, the face frame 403 is specified as the tracking target on the basis of the position of the touch pointer 406. Note that instead of the display shown in FIG. 4E, when a positional relationship by which a face frame can be specified using the touch pointer 406 is established while moving the touch pointer 406 prior to the touch-up, a display (an adsorption display) indicating the face that will be specified if a touch-up is performed at that point may be displayed.

FIG. 4F shows an example display of an adsorption display. The touch pointer 406 is moved in accordance with the touch-move, and when the touch pointer 406 reaches a position in which the face frame 403 can be specified, the touch pointer 406 is no longer displayed, and the face frame 403 is displayed in a different display form to the other face frames. In so doing, the user can recognize that if they perform a touch-up at that point in time, the face frame 403 will be specified, and thus the user can easily determine whether or not the touch-move has been performed successfully to the target position.

Figure 4G:
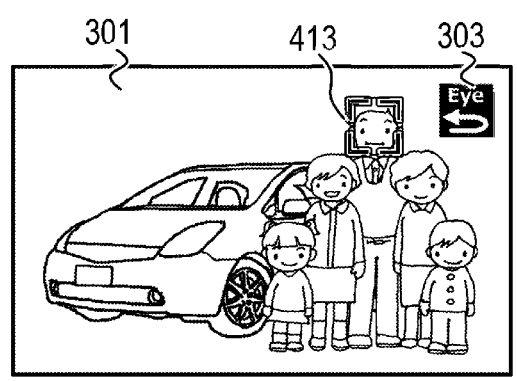

FIG. 4G is an example display of a case in which a touch-up has been performed from the state shown in FIG. 4E or 4F. The face frame 403 is set as the tracking target on the basis of the position of the touch pointer 406 immediately before the touch-up, a tracking frame 413 is displayed, and tracking is begun. In this state, movement of the touch pointer 406 by means of touch-and-drag is complete, and the icon 303 is displayed. Note that by further touching the touch panel 70a and performing a touch-move thereon from the state shown in FIG. 4G or 4C, tracking can be canceled, the touch pointer 406 can be displayed in the position of the canceled tracking target, and the touch pointer 406 can be moved in accordance with the touch-move.

In the examples described above, it is assumed that the position on which the user wishes to focus is the face indicated by the face frame 403 included in the LV image 301. In this case, the tracking target (the AF position) can be set in the position of the face frame 403 as follows. First, by looking at the part of the LV image 301 near the face frame 403, a range is specified quickly and roughly, as shown in FIG. 4B. Next, by moving and thereby finely adjusting the touch pointer 406 by means of a touch operation from the position of the face frame 402, which is the tracking target set on the basis of the line-of-sight pointer 310, the touch pointer 406 can be accurately aligned with the face frame 403. As regards the movement amount of the touch-move performed at this time, since the face frame 402 near the face frame 403 has already been set on the basis of the line-of-sight input and the movement amount is an amount therefrom, a small movement amount is sufficient. Hence, according to this embodiment, the user can specify the desired position (subject) quickly and accurately.

Next, processing for realizing the above operations and screen transitions will be described.

<Shooting Mode Processing>

Figure 5A:
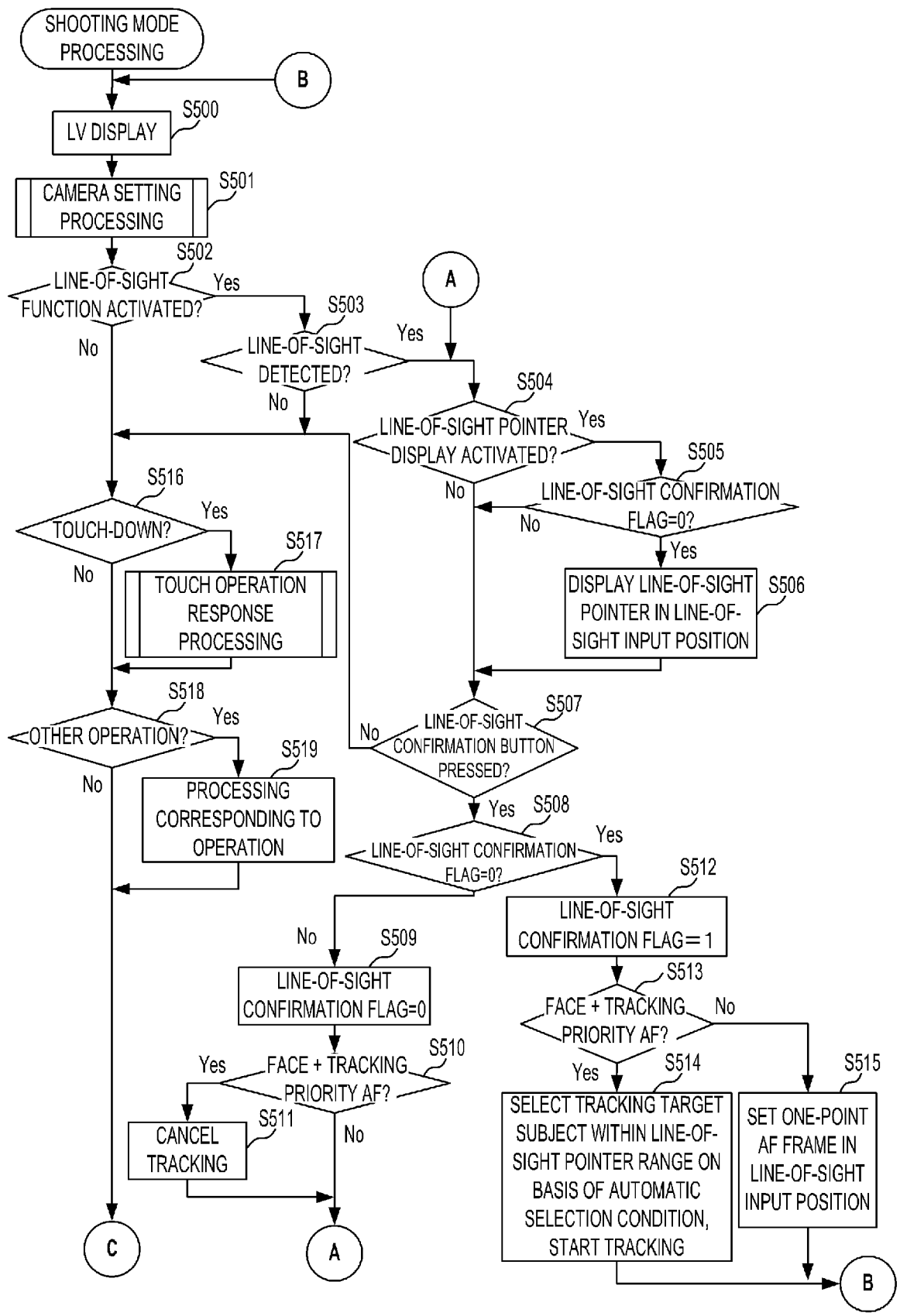
FIG. 5A is a flowchart of shooting mode processing.
Figure 5B:
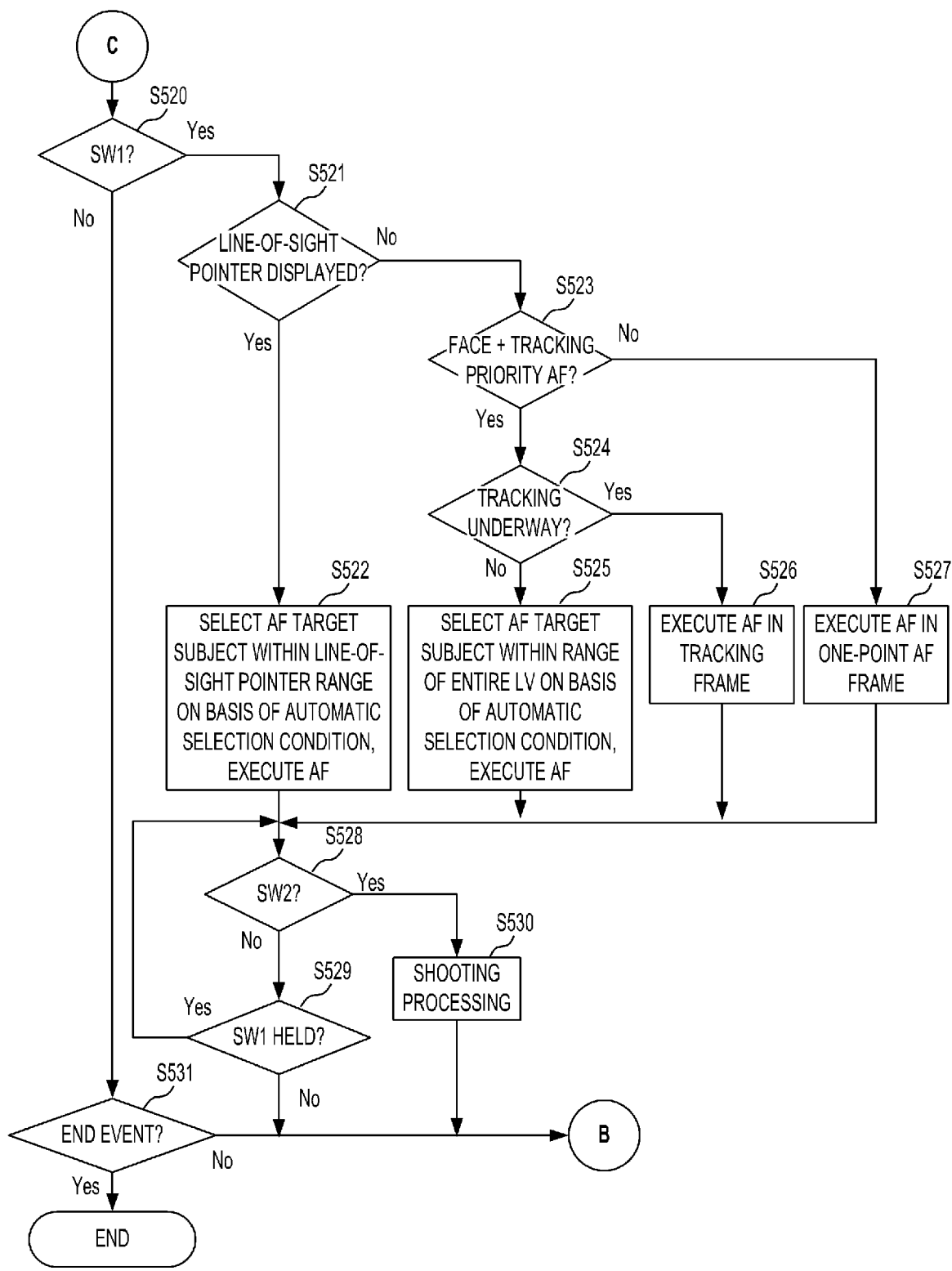
FIG. 5B is a flowchart of shooting mode processing.

FIGS. 5A and 5B are flowcharts of shooting mode processing performed by the digital camera 100 according to this embodiment. The processing of FIGS. 5A and 5B is assumed to be processing performed in a case where the display destination is the EVF 29. The processing of each of the flowcharts of FIGS. 5A to 10, including FIGS. 5A and 5B, is realized by expanding by system control unit 50 the program stored in the nonvolatile memory 56 to the system memory 52 and executing the program. When the digital camera 100 is activated in the shooting mode, flags, control variables, and so on are initialized, whereupon the processing of FIGS. 5A and 5B is begun.

In S500, the system control unit 50 starts capturing a live view image (an LV image) using the imaging unit 22 and displays the captured LV image on the EVF 29.

In S501, the system control unit 50 performs camera setting processing for performing various settings relating to image capture in response to user operations. The camera setting processing will be described in detail below using FIG. 6.

In S502, the system control unit 50 determines whether or not the line-of-sight function is activated (whether or not a line-of-sight AF setting, to be described below, is activated). When the line-of-sight function is activated, the processing advances to S503, and when the line-of-sight function is not activated (i.e., deactivated), the processing advances to S516.

In S503, the system control unit 50 determines whether or not a line-of-sight has been detected by the line-of-sight detection unit 160. When a line-of-sight has been detected, the processing advances to S504, and when a line-of-sight has not been detected (when the line-of-sight function is activated but a line-of-sight has not been detected), the processing advances to S516.

In S504, the system control unit 50 determines whether or not line-of-sight pointer display is activated. When line-of-sight pointer display is activated, the processing advances to S505, and when line-of-sight pointer display is not activated (i.e., deactivated), the processing advances to S507.

In S505, the system control unit 50 determines whether or not a line-of-sight confirmation flag held in the system memory is at 0. The initial value is 0. Line-of-sight confirmation flag=0 denotes a state in which the line-of-sight confirmation state described above has been canceled, and in this state, the line-of-sight pointer can be moved by line-of-sight. Line-of-sight confirmation flag=0 also denotes a "rough adjustment mode" in which a position can be specified roughly by line-of-sight. Line-of-sight confirmation flag=1, on the other hand, denotes the line-of-sight confirmation state described above. In this state, a position has been specified roughly by line-of-sight, and therefore position specification by line-of-sight is not possible. Line-of-sight confirmation flag=1 also denotes a "fine adjustment mode" in which a position can be specified precisely by means of a touch-move. When the line-of-sight flag is at 0, the processing advances to S506, and when the line-of-sight flag is not at 0 (when line-of-sight confirmation flag=1 is established), the processing advances to S507.

In S506, the system control unit 50 displays the line-of-sight pointer 310 on the EVF 29 using the line-of-sight input position detected by the line-of-sight detection unit 160 as a reference. As noted above, the line-of-sight pointer 310 is displayed at a first size having a certain magnitude on the basis of a position acquired by averaging the line-of-sight input position over a predetermined period. When the averaged line-of-sight detection position is not near an end portion of the EVF 29, the line-of-sight pointer 310 is displayed in a range of the first size centering on the line-of-sight input position. When the averaged line-of-sight detection position is near an end portion of the EVF 29, the line-of-sight pointer 310 is displayed in a range of the first size touching the end of the screen that is closest to the line-of-sight input position. As a result of the processing of S506, when one-point AF is set as the AF method, a display such as that shown in FIGS. 3A and 3B is displayed, and when face+tracking priority is set, a display such as that shown in FIGS. 4A and 4B is displayed.

In S507, the system control unit 50 determines whether or not the line-of-sight confirmation button 82 has been pressed (in other words, whether or not an operation for instructing the execution of position specification by line-of-sight has been performed). When the line-of-sight confirmation button 82 has been pressed, the processing advances to S508, and when the line-of-sight confirmation button 82 has not been pressed, the processing advances to S516.

In S508, the system control unit 50 determines whether or not the line-of-sight confirmation flag held in the system memory 52 is at 0. When line-of-sight confirmation flag=0 is established, the processing advances to S512, and when line-of-sight confirmation flag=0 is not established (when line-of-sight confirmation flag=1 is established), the processing advances to S509.

In S509, the system control unit 50 sets the line-of-sight confirmation flag at 0. Further, the system control unit 50 sets the icon 303 displayed up to that point at non-display, thereby returning to display of a state in which line-of-sight confirmation has been canceled.

In S510, the system control unit 50 determines whether or not the currently set AF method is face+tracking priority AF. When the currently set AF method is face+tracking priority AF, the processing advances to S511, where tracking is canceled, and then the processing advances to S504. As a result, in a case where the aforesaid display of FIG. 4C or 4G, for example, is displayed, the display transitions to the display state of FIG. 4A or 4B in response to depression of the line-of-sight confirmation button 82. When it is determined in S510 that the currently set AF method is not face+tracking priority AF (in other words, when it is determined that the currently set AF method is one-point AF), the processing advances to S504. As a result, in a case where the aforesaid display of FIG. 3C or 3F, for example, is displayed, the display transitions to the display state of FIG. 3A or 3B in response to depression of the line-of-sight confirmation button 82.

In S512, the system control unit 50 sets the line-of-sight confirmation flag at 1. Further, the system control unit 50 displays the icon 303 on the EVF 29, thereby displaying the line-of-sight confirmation state.

In S513, the system control unit 50 determines whether or not the currently set AF method is face+tracking priority AF. When the currently set AF method is face+tracking priority AF, the processing advances to S514, and when the currently set AF method is not face+tracking priority AF (in other words, when the currently set AF method is one-point AF), the processing advances to S515.

In S514, a subject which is the tracking target is selected on the basis of the automatic selection condition described above within a range of the first size indicated by the line-of-sight pointer 310 (and within a similar range likewise when the line-of-sight pointer 310 is not displayed). A tracking frame is then displayed on the selected subject (the tracking target), and tracking is begun. Accordingly, the display transitions from that of FIG. 4B to that of FIG. 4C, for example.

In S515, the system control unit 50 sets the one-point AF frame 302 in the line-of-sight input position (a position acquired by averaging the position detected by the line-of-sight detection unit 160 over a predetermined period) at the point where the line-of-sight confirmation button 82 was pressed. Accordingly, the display transitions from that of FIG. 3B to that of FIG. 3C, for example. Note that in the example described in this embodiment, in the case of one-point AF, the one-point AF frame is set in the line-of-sight input position detected by the line-of-sight detection unit 160. However, the present embodiment is not limited thereto, and likewise in the case of one-point AF, similarly to face+tracking priority AF, automatic selection may be performed within the range of the line-of-sight pointer 310 on the basis of the automatic selection condition, and the one-point AF frame 302 may be set in the position of the automatically selected subject.

In S516, the system control unit 50 determines whether or not a touch-down has been performed on the touch panel 70a. When a touch-down has been performed, the processing advances to S517, and when a touch-down has not been performed, the processing advances to S518.

In S517, the system control unit 50 performs touch operation response processing in response to touch operations performed on the touch panel 70a. The touch operation response processing will be described below using FIG. 7.

In S518, the system control unit 50 determines whether or not another operation has been performed on the operation unit 70. When another operation has been performed, the processing advances to S519, and when another operation has not been performed, the processing advances to S520.

In S519, the system control unit 50 performs processing corresponding to the other operation. For example, various shooting parameters, such as the shutter speed, the aperture value, and an exposure correction value, may be modified, and the recording image quality and a self-timer may be set.

In S520, the system control unit 50 determines whether or not the first shutter switch signal SW1 is ON, or in other words whether or not the shutter button 61 has been half-pressed in order to issue a shooting preparation instruction.

In S521, the system control unit 50 determines whether or not the line-of-sight pointer 310 is being displayed, or in other words whether or not the line-of-sight function is activated, line-of-sight detection is underway, display of the line-of-sight pointer is activated, and line-of-sight confirmation flag=0 is established. When the line-of-sight pointer 310 is being displayed, the processing advances to S522, and when the line-of-sight pointer 310 is not being displayed, the processing advances to S523. Note that instead of determining whether or not the line-of-sight pointer 310 is being displayed, a determination may be made as to whether or not the line-of-sight function is activated, line-of-sight detection is underway, and line-of-sight confirmation flag=0 is established. In this case, when the line-of-sight function is activated, line-of-sight detection is underway, and line-of-sight confirmation flag=0 is established, the processing advances to S522 even in a case where display of the line-of-sight pointer 310 is deactivated (the line-of-sight pointer 310 is not displayed).

In S522, the system control unit 50 selects a subject as an AF target on the basis of the automatic selection condition, described above, within the range of the first size indicated by the line-of-sight pointer 310 (and within a similar range likewise when the line-of-sight pointer 310 is not displayed). This processing is similar to the processing for selecting the tracking target in S514. AF is then executed on the basis of the selected subject (the AF target, the focus adjustment target). Similarly, processing such as AF and AWB may be performed using the selected subject as a reference. Note that when the AF method is one-point AF, instead of selecting the AF target on the basis of the automatic selection condition, the range of the one-point AF frame centering on the line-of-sight input position at that point in time may be selected as the AF target.

In S523, the system control unit 50 determines whether or not the currently set AF method is face+tracking priority AF. When the currently set AF method is face+tracking priority AF, the processing advances to S524, and when the currently set AF method is not face+tracking priority AF (when the currently set AF method is one-point AF), the processing advances to S527.

In S524, the system control unit 50 determines whether or not tracking of the subject is underway. When tracking is underway, the processing advances to S526, and when tracking is not underway, the processing advances to S525.

In S525, the system control unit 50 selects a subject as the AF target on the basis of the automatic selection condition, described above, using the entire range of the captured LV image. AF is then executed on the basis of the selected subject (the AF target, the focus adjustment target). Similarly, processing such as AF and AWB may be performed using the selected subject as a reference. Note that the present embodiment is not limited to using the entire range of the LV image, and instead, a range, within the LV image, of a second size that is larger than the first size, i.e., the size of the line-of-sight pointer 310, may be set. For example, a range (>the first size) of 80% from the center of the LV image may be set as the range for automatically selecting the subject on the basis of the automatic selection condition in S525. In this case, the likelihood of a main subject to be subjected to AF existing in the remaining end regions is considered low, and therefore these regions are excluded from automatic subject selection based on the automatic selection condition in S525.

In S526, the system control unit 50 executes AF using the tracking frame currently being tracked (in other words, on the tracking target). Similarly, processing such as AF and AWB may be performed using the tracking target as a reference.

In S527, the system control unit 50 executes AF in the set one-point AF frame. Similarly, processing such as AF and AWB may be performed using the one-point AF frame as a reference.

In S528, the system control unit 50 determines whether or not the second shutter switch signal SW2 is ON, or in other words whether or not the shutter button 61 has been fully pressed in order to issue a shooting instruction. When SW2 is ON, the processing advances to S530, and when SW2 is not ON, the processing advances to S529.

In S529, the system control unit 50 determines whether or not SW1 is being held at ON. When SW1 is being held at ON, the processing returns to S528, and when SW1 is not being held at ON (when SW1 is OFF), the processing advances to S531.

In S530, the system control unit 50 performs a series of shooting processing (the shooting processing described above) from exposure by the imaging unit 22 to recording of the captured image in the recording medium 200 in the form of an image file.

In S531, a determination is made as to whether or not a shooting mode end event (an operation to switch the power supply OFF, an instruction to transition to another operation mode such as the playback mode, or the like) has occurred. When an end event has not occurred, the processing returns to S500 and is repeated, and when an end event has occurred, the shooting mode processing ends.

<Camera Setting Processing>

The aforementioned camera setting processing performed in S501 of FIG. 5A will now be described. The camera setting processing is processing for setting respective setting items on a shooting-related setting menu screen that is displayed when the menu button 81 is pressed.

Figure 11A:
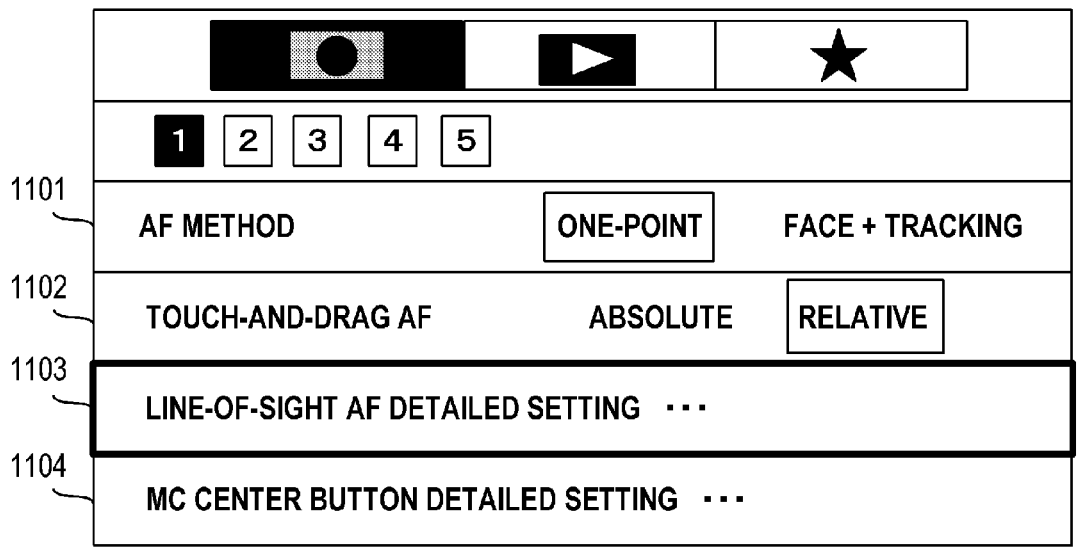
FIGS. 11A and 11B are example displays of setting menu screens.
Figure 11B:
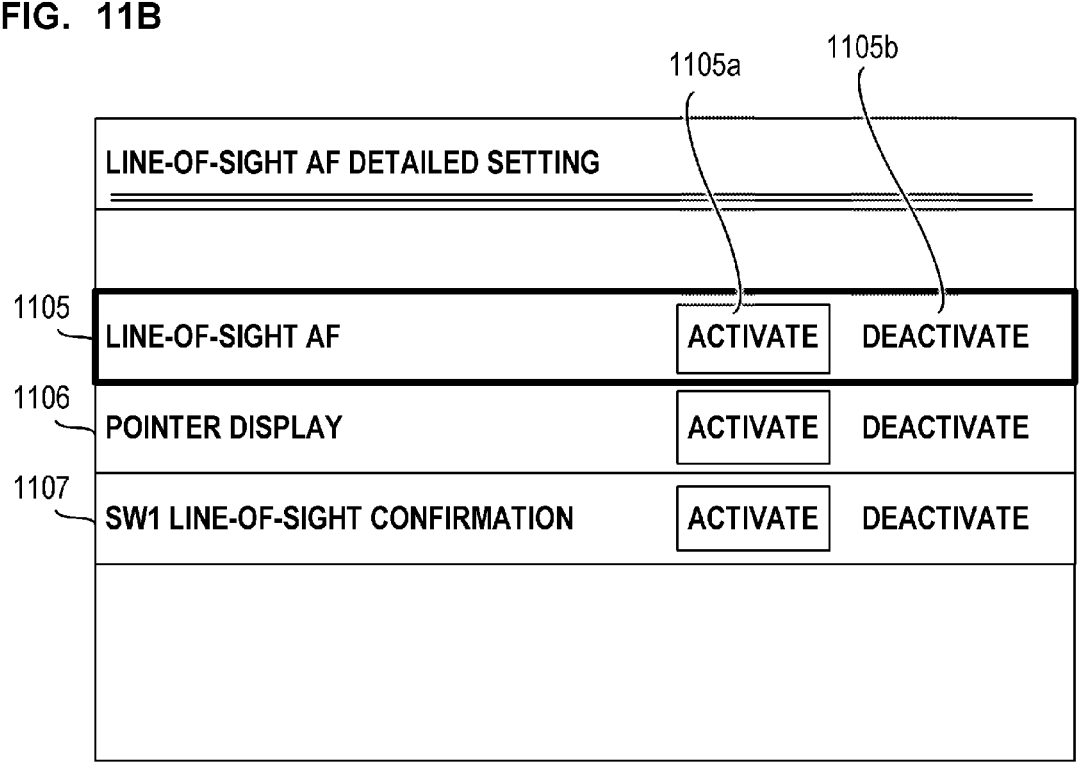

FIGS. 11A and 11B show example displays of shooting-related setting menu screens displayed on the EVF 29 or the display unit 28. A setting item 1101 included in the menu screen of FIG. 11A is an item for setting the AF method. A setting item 1102 is an item for setting touch-and-drag AF. A setting item 1103 is an item for performing settings relating to the line-of-sight function. A setting item 1104 is an item for setting the operation that is performed when the central part of the MC 65 is pressed.

FIG. 11B is an example display of a detailed setting menu screen for line-of-sight AF, on which settings relating to the line-of-sight function are performed. This screen is displayed when the setting item 1103 of FIG. 11A is selected. Setting items 1105-1107 are displayed on the detailed setting menu screen for line-of-sight AF, shown in FIG. 11B. The setting item 1105 is an item for activating or deactivating the line-of-sight function. The setting item 1106 is an item for activating (displaying) or deactivating (not displaying) display of the line-of-sight pointer. The setting item 1107 is an item for activating or deactivating a function for causing the AF frame to jump to the line-of-sight detection position when SW1 is switched ON.

Figure 6:
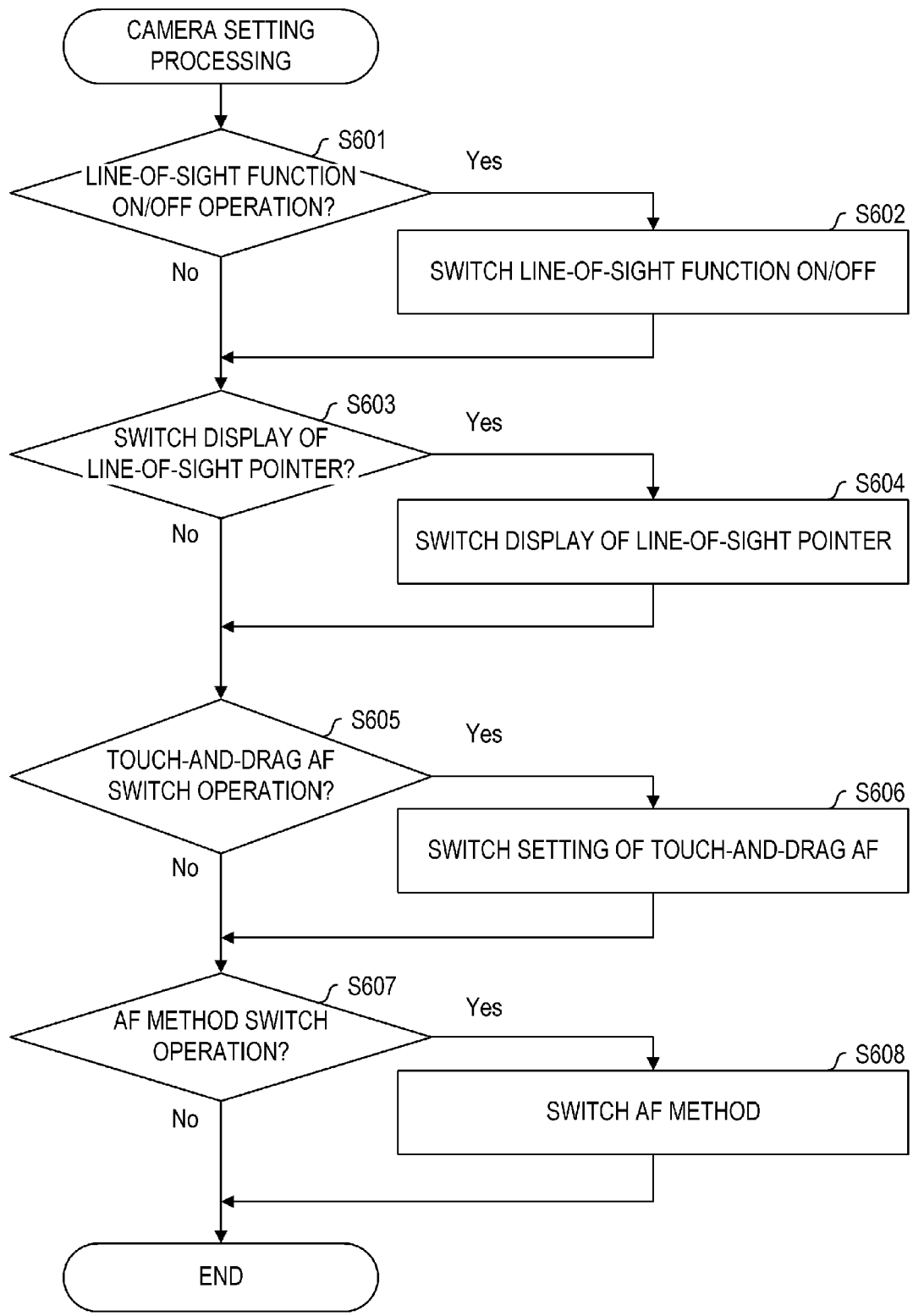
FIG. 6 is a flowchart of camera setting processing.

FIG. 6 is a flowchart showing in detail the camera setting processing performed in S501 of FIG. 5A.

In S601, the system control unit 50 determines whether or not an operation for switching the line-of-sight function (line-of-sight AF) ON/OFF (activating/deactivating the line-of-sight function) has been performed on the operation unit 70. In this embodiment, the operation for switching the line-of-sight function ON/OFF (activating/deactivating the line-of-sight function) is an operation for opening the menu screen and switching the setting by selecting the relevant setting item (the setting item 1105). In this embodiment, the function for inputting the line-of-sight of the user is activated when line-of-sight AF is switched ON and deactivated when line-of-sight AF is switched OFF. When the operation for switching the line-of-sight function ON/OFF has been performed, the processing advances to S602, and when the operation has not been performed, the processing advances to S603.

In S602, the system control unit 50 switches the line-of-sight function ON/OFF and records the modified setting content in the nonvolatile memory 56.

In S603, the system control unit 50 determines whether or not an operation for switching display of the line-of-sight pointer ON/OFF (activating/deactivating display of the line-of-sight pointer) has been performed on the operation unit 70. In this embodiment, the operation for switching the display of the line-of-sight pointer ON/OFF (activating/deactivating the line-of-sight confirmation function) is an operation for opening the menu screen and switching the setting by selecting the relevant setting item (the setting item 1106). In this embodiment, when display of the line-of-sight pointer is switched ON, the line-of-sight pointer 310 is displayed as a GUI in response to line-of-sight input by the user, and when display of the line-of-sight pointer is switched OFF, the line-of-sight pointer is not displayed. When the operation for switching display of the line-of-sight pointer ON/OFF has been performed, the processing advances to S604, and when the operation has not been performed, the processing advances to S605.

In S604, the system control unit 50 switches display of the line-of-sight pointer ON/OFF (activates/deactivates display of the line-of-sight pointer) and records the modified setting content in the nonvolatile memory 56.

In S605, the system control unit 50 determines whether or not an operation for switching the setting of the touch-and-drag AF function has been performed on the operation unit 70. In this embodiment, the operation for switching the setting of the touch-and-drag AF function is an operation for opening the menu screen and switching the setting by selecting the relevant setting item (the setting item 1102). In this embodiment, either "absolute (the aforesaid absolute position specification method)" or "relative (the aforesaid relative position specification method)" can be selected as the touch-and-drag AF setting. When the operation for switching the touch-and-drag AF function has been performed, the processing advances to S606, and when the operation has not been performed, the processing advances to S607.

In S606, the system control unit 50 switches the setting of the touch-and-drag AF function and records the modified setting content in the nonvolatile memory 56.

In S607, the system control unit 50 determines whether or not an operation for switching the AF method has been performed on the operation unit 70. In this embodiment, the operation for switching the AF method is an operation for opening the menu screen and switching the setting by selecting the relevant setting item (the setting item 1101). When the operation for switching the AF method has been performed, the processing advances to S608, and when the operation has not been performed, the camera setting processing ends. Note that in the example described in this embodiment, either face+tracking priority AF or one-point AF can be selected as the AF method, but other AF methods (zone AF, multipoint AF, and so on) may also be set.

In S608, the system control unit 50 switches the AF method and records the modified setting content in the nonvolatile memory 56.

<Touch Operation Response Processing>

Figure 7:
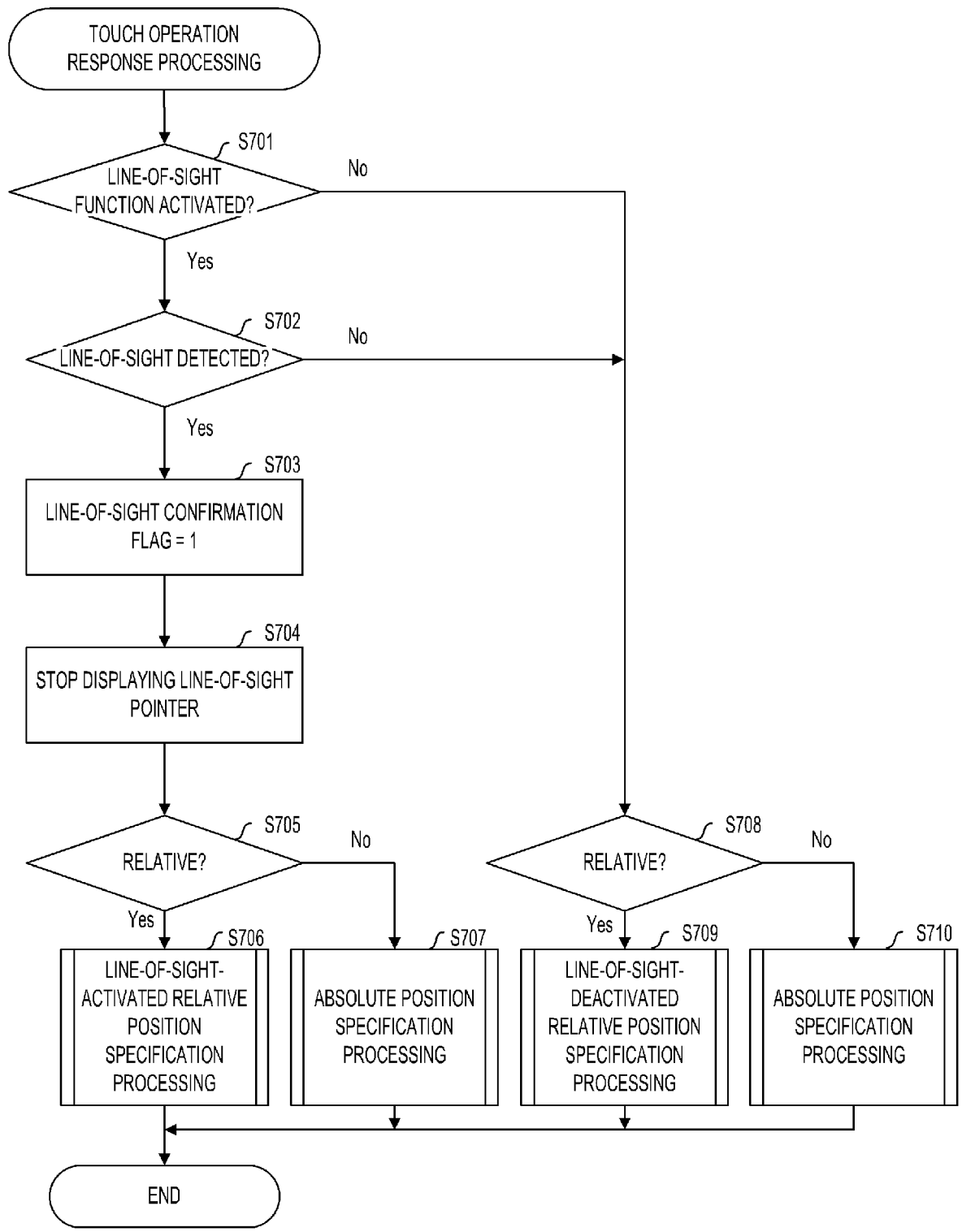
FIG. 7 is a flowchart of touch operation response processing.

FIG. 7 is a flowchart showing in detail the touch operation response processing performed in S517 of FIG. 5A.

In S701, similarly to S502, the system control unit 50 determines whether or not the line-of-sight function is activated. When the line-of-sight function is activated, the processing advances to S702, and when the line-of-sight function is not activated (i.e., deactivated), the processing advances to S708.

In S702, similarly to S503, the system control unit 50 determines whether or not a line-of-sight has been detected. When a line-of-sight has been detected, the processing advances to S703, and when a line-of-sight has not been detected, the processing advances to S708.

In S703, the system control unit 50 sets the line-of-sight confirmation flag at 1.

In S704, the system control unit 50 sets the line-of-sight pointer at non-display.

In S705, the system control unit 50 determines whether or not the touch-and-drag AF setting of the setting item 1102 in FIG. 11A indicates the relative position specification method. When the setting indicates the relative position specification method, the processing advances to S706, and when the setting does not indicate the relative position specification method (when the setting indicates the absolute position specification method), the processing advances to S707.

In S706, the system control unit 50 performs line-of-sight-activated relative position specification processing. This processing will be described in detail below using FIG. 8.

In S707, the system control unit 50 performs absolute position specification processing. This processing will be described in detail below using FIG. 10.

In S708, similarly to S705, the system control unit 50 determines whether or not the touch-and-drag AF setting indicates the relative position specification method. When the setting indicates the relative position specification method, the processing advances to S709, and when the setting does not indicate the relative position specification method (when the setting indicates the absolute position specification method), the processing advances to S710.

In S709, the system control unit 50 performs line-of-sight-deactivated relative position specification processing. This processing will be described in detail below using FIG. 9.

In S710, the system control unit 50 performs absolute position specification processing. This processing is similar to the processing of S709, and will be described below using FIG. 10.

In the example described above, when the line-of-sight function is activated (S701—Yes) and a line-of-sight has been detected (Yes in S702), a determination is made in S705 as to whether or not the touch-and-drag AF setting indicates the relative position specification method, and when the setting indicates the absolute position specification method, absolute position specification processing is performed in S707. However, the present embodiment is not limited thereto. When the line-of-sight function is activated (Yes in S701) or when the line-of-sight function is activated and a line-of-sight has been detected (Yes in both S701 and S702), the line-of-sight-activated relative position specification processing may be performed regardless of the touch-and-drag AF setting. In other words, when Yes is acquired in S701, the processing of S703 and S704 may be performed without performing the determination of S702, and thereafter, the processing of S706 may be performed without performing the determination of S705. Alternatively, when Yes is acquired in S701 and Yes is also acquired in S702, the processing of S703 and S704 may be performed, whereupon the processing of S706 may be performed without performing the determination of S705. Thus, in a state where the line-of-sight function can be used, it is possible to roughly specify a position by line-of-sight and then finely adjust the position specified by line-of-sight by means of relative position specification using a touch operation.

<Line-of-Sight-Activated Relative Position Specification Processing>

FIG. 8 is a flowchart showing in detail the aforementioned line-of-sight-activated relative position specification processing performed in S706 of FIG. 7.

In S801, the system control unit 50 determines whether or not the AF method is "face+tracking priority AF". When the AF method is "face+tracking priority AF", the processing advances to S805, and when the AF method is not "face+tracking priority AF" (in this embodiment, when the AF method is "one-point AF"), the processing advances to S802.

In S802, the system control unit 50 displays the one-point AF frame in the line-of-sight input position (a position acquired by averaging the position detected by the line-of-sight detection unit 160 over a predetermined period) at the point in time when the touch-down was performed. As a result, the display transitions from the display of FIG. 3B to the display of FIG. 3D, as described above.

In S803, the system control unit 50 moves the one-point AF frame in accordance with the touch-move performed on the touch panel 70a. This movement is performed using the relative position specification method.

In S804, the system control unit 50 determines whether or not a touch-up from the touch panel 70a has been performed. When a touch-up has been performed, the icon 303 is displayed (whereby the display transitions to the display of FIG. 3F, described above), and the processing of FIG. 8 ends. When a touch-up has not been performed, the processing returns to S803.

In S805, the system control unit 50 determines whether or not a subject is being tracked. When tracking is underway, the processing advances to S810, and when tracking is not underway, the processing advances to S806.

In S806, the system control unit 50 displays the touch pointer 406 (a second item indicating a range of the second size; a small pointer) indicating the touch position (the selected position) in the line-of-sight input position at the point in time when the touch-down was performed. As a result, the display transitions from FIG. 4B to 4D, for example. Here, the line-of-sight input position is a position acquired by averaging the position detected by the line-of-sight detection unit 160 over a predetermined period, for example.

In S807, the system control unit 50 moves the touch pointer 406 indicating the touch position in accordance with the touch-move (a movement instruction operation) performed on the touch panel 70a. This movement is movement according to the relative position specification method. As a result, the display transitions from FIG. 4D to 4E, for example. It may be assumed here that the system control unit 50 moves the display position of the touch pointer 406 in accordance with the touch-move, not on the basis of the line-of-sight input following display of the touch pointer 406.

In S808, the system control unit 50 determines whether or not a touch-up from the touch panel 70a has been performed. When a touch-up has been performed, the processing advances to S809, and when a touch-up has not been performed, the processing returns to S807.

In S809, the system control unit 50 selects the subject in the position of the touch pointer and starts tracking the subject. The selection at this time is not based on the automatic selection condition described above. Further, the icon 303 is displayed. As a result, the display transitions from FIG. 4E to 4G, for example.

In S810, the system control unit 50 displays the touch pointer 406 (the second item indicating a range of the second size; the small pointer) indicating the touch position (the selected position) in the position of the tracking target at the point in time when the touch-down was performed.

The processing of S811-S813 is similar to the processing of S806-S809, respectively, and therefore description thereof has been omitted.

Note that in the example described in this embodiment, when a touch-down has been performed while line-of-sight is activated and tracking is underway, the touch pointer 406 is displayed in the tracking position rather than the line-of-sight input position. However, the present embodiment is not limited thereto, and as long as line-of-sight is activated, the touch pointer 406 may be displayed in the line-of-sight input position (a position acquired by averaging the position detected by the line-of-sight detection unit 160 over a predetermined period) when a touch-down has been performed, regardless of whether or not tracking is underway. In this case, when Yes is acquired in S801, the processing advances to S806 without performing the determination of S805.

Further, when subject tracking is performed by means of a touch-up in the relative position specification method (S809, S813, and S908 and S912, to be described below), subject tracking may be started following the elapse of a fixed time after the touch-up. Thus, when the touch pointer is moved while repeatedly performing a series of operations including a touch-down, a touch-move, and a touch-up in the case of the relative position specification method, the subject tracking processing is not activated every time the series is performed, and as a result, the touch pointer can be moved more easily.

<Line-of-Sight-Deactivated Relative Position Specification Processing>

FIG. 9 is a flowchart showing in detail the aforementioned line-of-sight-deactivated relative position specification processing performed in S709 of FIG. 7.

In S901, the system control unit 50 determines whether or not the AF method is "face+tracking priority AF". When the AF method is "face+tracking priority AF", the processing advances to S902, and when the AF method is not "face+tracking priority AF" (in this embodiment, when the AF method is "one-point AF"), the processing advances to S904.

In S902, the system control unit 50 moves the one-point AF frame in response to a touch-move performed on the touch panel 70a. Note that since line-of-sight input is not being detected and the relative position specification method is set, the position of the one-point AF frame is not moved in response to a touch-down, and instead, the one-point AF frame is moved in accordance with the relative position specification method by a distance corresponding to the touch-move from the position of the one-point AF frame set prior to the touch-down.

In S903, the system control unit 50 determines whether or not a touch-up from the touch panel 70a has been performed. When a touch-up has been performed, the processing of FIG. 9 ends, and when a touch-up has not been performed, the processing returns to S902.

In S904, the system control unit 50 determines whether or not a subject is being tracked. When tracking is underway, the processing advances to S909, and when tracking is not underway, the processing advances to S905.

In S905, the system control unit 50 displays the touch pointer 406 (the second item indicating a range of the second size; the small pointer) indicating the touch position (the selected position) in the center of the EVF 29.

The processing of S906-S912 is similar to the processing of S807-S813 in FIG. 7, respectively, and therefore description thereof has been omitted.

<Absolute Position Specification Processing>

FIG. 10 is a flowchart showing in detail the absolute position specification processing performed in S707 and S710 of FIG. 7.

In S1001, the system control unit 50 determines whether or not the AF method is "face+tracking priority AF". When the AF method is "face+tracking priority AF", the processing advances to S1005, and when the AF method is not "face+tracking priority AF" (in this embodiment, when the AF method is "one-point AF"), the processing advances to S1002.

In S1002, the system control unit 50 displays the one-point AF frame in a position on the EVF 29 that corresponds to the touch position (the touch-down position) in which the touch-down was performed.

In S1003, the system control unit 50 moves the one-point AF frame to a position on the EVF 29 that corresponds to the touch position following the touch-move in response to the touch-move. This movement is performed in accordance with the absolute position specification method, and the position of the one-point AF frame following the movement corresponds to the most recent touch position rather than being based on the distance or direction of the touch-move.

In S1004, the system control unit 50 determines whether or not a touch-up from the touch panel 70a has been performed. When a touch-up has been performed, the processing of FIG. 10 ends, and when a touch-up has not been performed, the processing returns to S1003.

In S1005, the system control unit 50 displays the touch pointer 406 in a position on the EVF 29 that corresponds to the touch position (the touch-down position) in which the touch-down was performed.

In S1006, the system control unit 50 moves the touch pointer 406 to a position on the EVF 29 that corresponds to the touch position following the touch-move in response to the touch-move. This movement is performed in accordance with the absolute position specification method, and the position of the touch pointer 406 following the movement corresponds to the most recent touch position rather than being based on the distance or direction of the touch-move.

In S1007, the system control unit 50 determines whether or not a touch-up from the touch panel 70a has been performed. When a touch-up has been performed, the processing advances to S1008, and when a touch-up has not been performed, the processing returns to S1006.

In S1008, the system control unit 50 selects the subject in the position of the touch pointer and starts tracking the subject. Further, the icon 303 is displayed, whereupon the processing of FIG. 10 ends.

According to this embodiment, as described above, a subject can be selected roughly by displaying a large pointer when the user performs line-of-sight input, and a position can be specified precisely by displaying a small pointer when the user performs a touch operation. As a result, the position intended by the user can be specified easily in a case where the position is specified using the line-of-sight input of the user and a touch operation.

Note that in the example described in the above embodiment, a small pointer (the touch pointer) is displayed in response to a touch operation, but the present embodiment is not limited thereto, and position specification for making fine adjustments may also be performed in response to an operation on an operating member such as the MC 65 or the four-direction key 74. Hence, in a state where rough position specification has been performed using the line-of-sight pointer, a position specification pointer (a pointer of the second size) for making fine adjustments may be displayed instead of the line-of-sight pointer in response to an operation performed on the MC 65 or the four-direction key 74. Then, by moving the position specification pointer for making fine adjustments in accordance with an operation performed on the MC 65 or the four-direction key 74, fine adjustments can be made to the specified position.

Note that the condition for canceling the line-of-sight confirmation flag is not limited to that of the above example. After the shooting processing has been performed once in S530, the line-of-sight confirmation flag may be automatically reset to 0. Alternatively, the line-of-sight function (the line-of-sight AF setting) may be "deactivated" at the same time as the line-of-sight confirmation flag is set at 1, whereupon the line-of-sight flag may be returned to 0 at a desired timing of the user (the timing at which the line-of-sight function is activated in S602). Alternatively, the line-of-sight flag may be returned to 0 automatically following the elapse of a fixed time after the first shutter switch 62 is switched OFF (after half-depression of the shutter button 61 is canceled).

Furthermore, an example in which the pointer is reduced in size following a touch operation was described, but the extent to which the size of the pointer is reduced may be modified in accordance with the camera settings and the use case. For example, in a servo AF mode (a second AF mode), the line-of-sight pointer or the touch pointer may be set at a larger size than in a one-shot AF mode (a first AF mode). Here, the servo AF mode is a mode for performing continuous AF, in which AF is executed continuously in the position of the AF frame. The servo AF mode is suitable for use when shooting a moving subject. The one-shot AF mode is an AF processing mode in which, after AF is executed once, the AF processing is stopped (the focus is locked; the focus position is fixed) until a new AF instruction is issued. More specifically, when the servo AF mode is set and a touch operation is not performed during line-of-sight input, a pointer (a third item indicating a range of a third size that is larger than the first size) that is larger than the line-of-sight pointer 310 described above is displayed in a position based on the line-of-sight input. Thus, when the subject on which to perform AF is a moving object not contained within a narrow range, the subject can be accommodated within a larger line-of-sight pointer, and as a result, the desired subject can be specified easily by line-of-sight. Alternatively, when the AF processing is executed in a state where the line-of-sight pointer is displayed, the AF processing may be executed in the servo AF mode, and when the AF processing is executed in a state where the touch pointer is displayed, AF may be executed in the one-shot AF mode.

Moreover, when zone AF, rather than face+tracking priority AF, is set as the AF method, the size of the line-of-sight pointer may be increased in accordance with the size of the zone used in the zone AF processing. In other words, the size of the line-of-sight pointer displayed during zone AF may be set at a fourth size that is larger than the first size displayed during face+tracking priority AF. Here, zone AF is an AF method suitable for shooting a moving object, in which a largeish zone is set in a position set by the user, and a subject that matches the automatic selection condition is set within the zone as the AF target.

In the example described in the above embodiment, the range in which the AF processing is executed is modified (reduced) in response to a touch operation, but instead, the size of the region in which the subject is to be detected or the type of subject to be detected may be modified in response to a touch operation. For example, when the AF processing is executed in a state where the line-of-sight pointer is displayed, the AF processing may be executed on a detected face, and when the AF processing is executed in a state where the touch pointer is displayed, the AF processing may be executed on a detected eye.

Note that when the display is switched from the line-of-sight pointer to the touch pointer, the position in which the touch pointer is displayed is not limited to that described above. For example, the touch pointer may be displayed in the position of the subject detected within the line-of-sight pointer.

Modified Example 1

In the example described in the above embodiment, at the time of subject selection by the digital camera 100, the line-of-sight pointer (the large pointer) is displayed when a touch operation has not been performed during line-of-sight input, and the touch pointer (the small pointer) is displayed when a touch operation has been performed. However, the present application is not limited to selection of a subject and may also be applied to position specification for another purpose. In other words, position selection can be performed as follows during a position specification operation other than subject selection. When an operation has not been performed on an operating member (a touch panel, for example) during line-of-sight input, a large pointer (indicator) is displayed, and by moving the large pointer by means of line-of-sight input, a position is specified roughly. A position is then specified precisely on the basis of an automatic selection condition within the range of the position specified roughly by line-of-sight input. Then, when an operation is performed on the operating member (the touch panel, for example), the display is switched from the large pointer to a small pointer, and by moving the small pointer (indicator) by performing an operation on the operating member, a position is specified precisely.

Figure 12A:
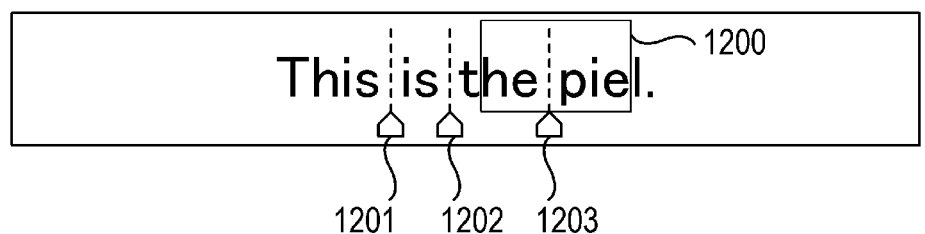
FIGS. 12A to 12C are example displays relating to selection of a character insertion position using line-of-sight.
Figure 12B:
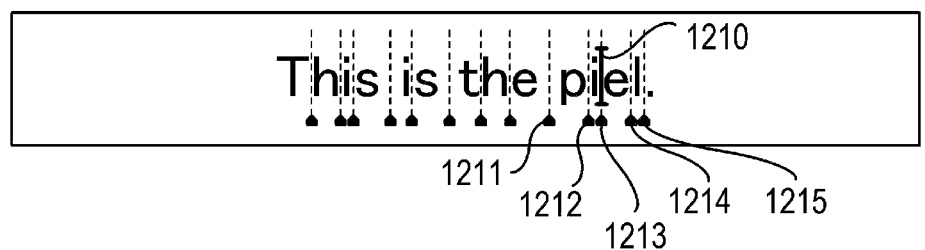
Figure 12C:
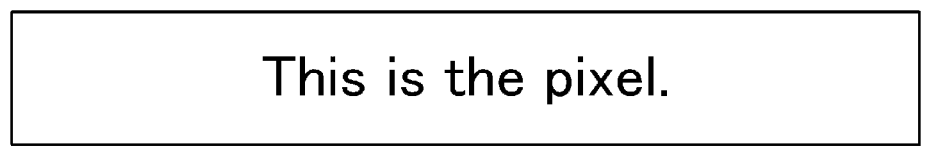

FIGS. 12A to 12C are example displays of a case in which the present application is applied to an operation for selecting a position in which to insert a character in a character string as an example (a modified example) of a different position specification operation to subject selection.

FIG. 12A shows an example display of a case in which a position in which to insert a character is selected using line-of-sight input from an inputted character string "This is the piel.". A line-of-sight pointer 1200 is displayed (follows the line-of-sight input position) in a predetermined range having the line-of-sight input position as a reference. When, in this state, a line-of-sight confirmation operation (an operation instructing the execution of position specification by line-of-sight) is performed, a character insertion position is determined within the range indicated by the line-of-sight pointer 1200 on the basis of an automatic selection condition. In this modified example, the automatic selection condition is "the position closest to the line-of-sight input position, among the clauses between the words". As shown in the figure, in the character string "This is the piel.", clauses 1201-1203 are detected. By performing the line-of-sight confirmation operation in a state where the line-of-sight pointer 1200 is in the position shown in FIG. 12A, the clause 1203 included in the line-of-sight pointer 1200 can be selected, and by then performing a character input operation, a character can be inserted in that position. During position specification in response to a line-of-sight confirmation operation performed in a state where the line-of-sight pointer 1200 is present, a position within a word cannot be selected. For example, in the state of FIG. 12A, a position between the "i" and the "e" of the word "piel" cannot be selected. The reason for this is that, as noted above, precise position specification using the line-of-sight input position is difficult due to human characteristics, and therefore, by limiting the insertion position to a clause in which a character is more likely to be inserted, the possibility of selecting an unintended position is reduced. Hence, simply by looking at the position in which a character is to be inserted, the character insertion position can be selected quickly and easily. Further, when a position specification operation using an operating member, such as an operation of the MC 65 or the four-direction key 74, is performed in the state shown in FIG. 12A, the line-of-sight pointer 1200 is no longer displayed, and a insertion position cursor 1210 is displayed in the line-of-sight input position. The position of the insertion position cursor 1210 can then be moved (finely adjusted) from the position in which the insertion position cursor 1210 is displayed in accordance with an operation performed on the operating member.

FIG. 12B shows an example display of a case in which an operation has been performed on the MC 65 or the four-direction key 74 or the like in the state of FIG. 12A. The line-of-sight pointer 1200 is no longer displayed, and the insertion position cursor 1210 is displayed in a position between the "i" and the "e" of the word "piel". The insertion position cursor 1210 is a pointer (an indicator) of a second size indicating the insertion position, and is smaller than the line-of-sight pointer 1200 having a first size. As shown in the figure, the insertion position cursor 1210 is capable of specifying a position between characters within a word, and can be moved as desired to positions 1211-1215 in accordance with an operation performed on the MC 65 or the four-direction key 74. For example, when the character "x" is inserted in a state where the insertion position cursor 1210 is positioned in the position of FIG. 12B, the character string can be corrected to "This is the pixel.", as shown in FIG. 12C.

Modified Example 2

The present invention is not limited to the example described in the above embodiment and may be applied in other situations where it is necessary to select a subject or a specification subject quickly and accurately. For example, the present invention can also be applied when a user wearing a headset that includes a head-mounted display (an HMD) selects a subject such as a virtual character displayed in a VR (Virtual Reality) image. When an operation has not been performed on an operating member (for example, a touch panel or an optical tracking pointer that can be touched and pressed) while line-of-sight input is underway, a large pointer (indicator) is displayed, and by moving the large pointer in accordance with the line-of-sight input, position specification is performed roughly. A position is then specified precisely within the range in which position specification was performed roughly by line-of-sight input on the basis of an automatic selection condition. Then, when an operation is performed on the operating member, the display is switched from the large pointer to a small pointer (indicator), whereupon a position is specified precisely by moving the small pointer (indicator) in accordance with the operation performed on the operating member.

Figure 13A:
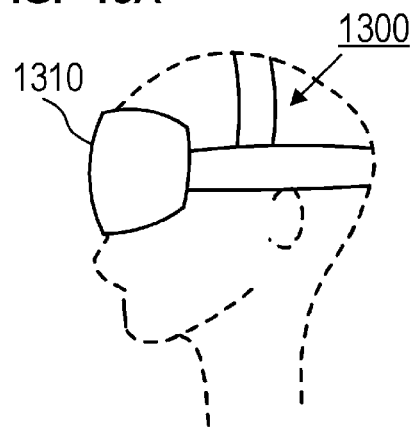
FIGS. 13A to 13C are external views of a headset 1300 and an operating member according to modified example 2.
Figure 13B:
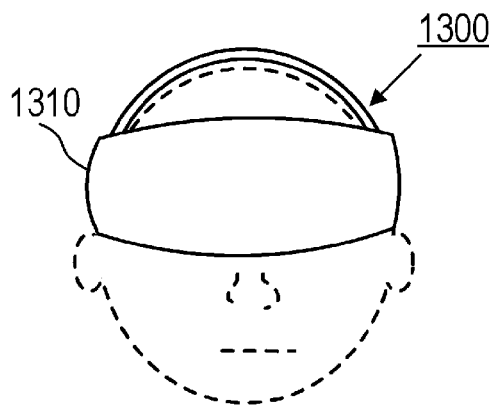
Figure 13C:
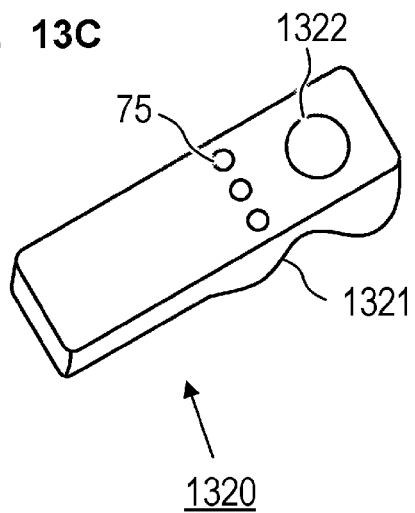

FIGS. 13A to 13C are external views of a headset 1300 and a game controller 1320 serving as an operating member.

FIGS. 13A and 13B are external views of the headset 1300. The headset 1300 is mainly constituted by an HMD 1310, and in modified example 2, the HMD 1310 is a VR device that can be used alone (a standalone type VR-HMD) and is not connected to a personal computer or the like. Parts required to apply this modified example, such as the system control unit 50 and the line-of-sight detection unit 160 shown in FIG. 2, are built into the HMD 1310.

FIG. 13C shows the game controller 1320. The game controller 1320 receives instructions such as an instruction to display a game screen 1400 (described below) that is displayed on the HMD 1310. The game controller 1320 includes a grip portion 1321, a multi-button 1322, which is a pressable operating member that includes a touchable part, and the SET button 75. The grip portion 1321, similarly to the grip portion 90 of the digital camera 100 described above, has a structure and a material that allows the user to grip the game controller 1320 easily. Various functions, such as a function for issuing an instruction to move a pointer displayed on the game screen 1400, can be allocated to the multi-button 1322. In modified example 2, the multi-button 1322 is an operating member capable of receiving both touch operations and pressing operations. A touch operation member installed in the multi-button 1322 may be a touch detection mechanism, such as that described above, or an infrared sensor. The infrared sensor is installed in the interior of the multi-button 1322 and emits infrared rays onto an upper portion (the part touched by the finger of the user) of the multi-button 1322. When the user touches the upper portion of the multi-button 1322, the infrared rays are reflected by the finger of the user, and by detecting this reflection light, movement of the finger of the user can be detected. An optical operating member of this type will be referred to as an optical tracking pointer (OTP). The OTP, similarly to the touch panel 70a, is capable of detecting movement operations constituted by movements of the finger (an operating body) of the user on the OTP. Note that the multi-button 1322 is not limited to an OTP and may also be a direction indicating member such as the MC 65, the four-direction key 74, or a joystick. Note that the HMD 1310 and the game controller 1320 may be connected either by wire or by wireless communication such as Bluetooth.

FIGS. 14A to 14F show example displays of game screens displayed on the HMD 1310 in an example (a modified example) of a position specification operation for specifying an attack target during an action game.

Figure 14A:
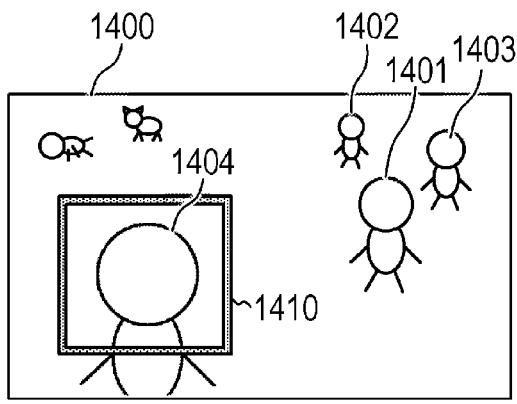
FIGS. 14A to 14F are views illustrating a position specification operation according to modified example 2.

FIG. 14A is an example display of a game screen displaying a state in which a plurality of attack targets 1401-1404 are virtually approaching a user who is playing an action game while wearing the headset 1300. At this time, a line-of-sight pointer 1410 is displayed in a position corresponding to the line-of-sight of the user, which is detected by the line-of-sight detection unit 160. In accordance with movement of the line-of-sight of the user, the line-of-sight pointer 1410 moves from the position shown in FIG. 14A to a position shown in FIG. 14B. Then, when a line-of-sight confirmation operation (specifically, pressing the multi-button 1322 or pressing the SET button 75) is performed using the operating member, a character serving as an attack target is determined within the range indicated by the line-of-sight pointer 1410 on the basis of an automatic selection condition. In modified example 2, the automatic selection condition is assumed to be "the target closest to the user within the range of the line-of-sight pointer".

Figure 14D:
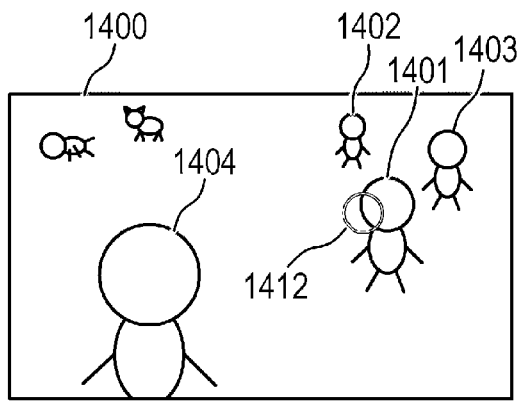
Figure 14B:
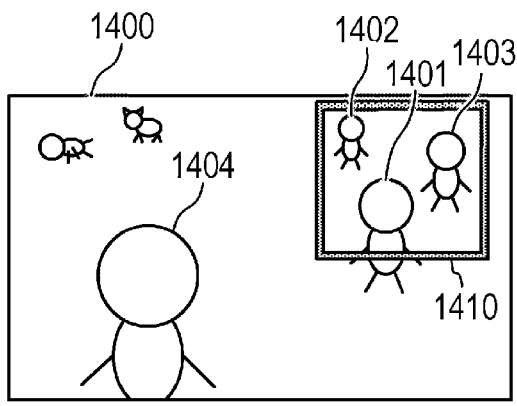

When a line-of-sight confirmation operation is performed in the state shown in FIG. 14B, in which the attack targets 1401-1404 exist on the game screen, a target frame 1411 is displayed. More specifically, the target 1401 that is closest, in virtual terms, to the user, among the targets 1401-1403 existing within the range of the line-of-sight pointer 1410, is selected in accordance with the automatic selection condition, whereupon the target frame 1411 is displayed thereon (FIG. 14C). Thus, the user, by moving their line-of-sight, can select and attack the target 1401 on which the target frame 1411 is displayed. However, the character that the user actually wishes to attack may be another character (the target 1402, for example) included in the range of the line-of-sight pointer 1410 rather than the automatically selected target 1401.

FIG. 14D shows an example display of a case in which a touch operation or the like has been performed on the MC 65, the four-direction key 74, or the OTP of the multi-button 1322 in the state shown in FIG. 14B. The line-of-sight pointer 1410 is no longer displayed, and instead a touch pointer 1412 is displayed. The touch pointer 1412 is assumed to be similar to the touch pointer 406 of FIG. 4. The touch pointer 1412 is smaller than the line-of-sight pointer 1410. By setting the display in this manner, the user can precisely specify (finely adjust) the target after roughly specifying the target (position) using the line-of-sight pointer 1410.

Figure 14E:
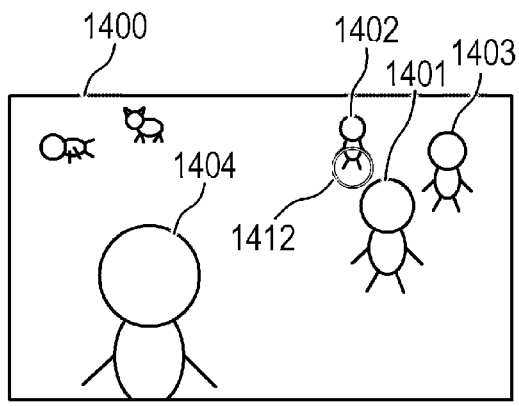
Figure 14C:
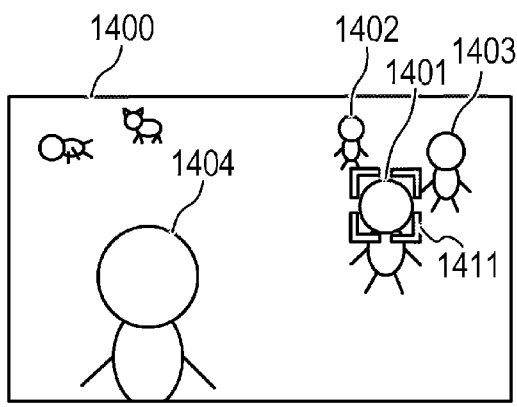

FIG. 14E shows an example display of a case in which the user has moved the touch pointer 1412 to the vicinity of the target 1402 by performing an operation on the multi-button 1322 or the MC 65 from the state shown in FIG. 14D. Since the user has already specified a position roughly by line-of-sight, the distance from the position shown in FIG. 14D to the position shown in FIG. 14E is short, and therefore moving the touch pointer 1412 does not require a large number of operations or a large amount of time.

Figure 14F:
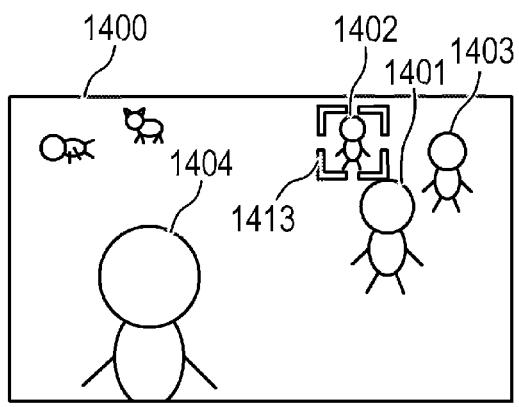

FIG. 14F shows an example display of a case in which either the multi-button 1322 has been pressed or a touch-up has been performed in the state shown in FIG. 14E. It can be seen that a target frame 1413 is displayed/set on the basis of the display position of the touch pointer 1412 immediately prior to pressing the multi-button 1322, and as a result, the target 1402 has been selected as the attack target.

It is logical to prioritize and select as attack targets the targets located on the near side of the user, for example, in order to increase the likelihood of a successful attack. However, at the point of the display shown in FIG. 14A, for example, although an attack on the target 1402 that is furthest away is less likely to be successful than an attack on the nearby target 1401, the number of points for a successful attack on the target 1402 may be higher. In this situation, the character to be selected as the attack target differs according to the strategy of the user. Hence, by allowing the user to perform fine adjustments by means of a movement/touch operation after a rough range has been specified quickly in accordance with the line-of-sight of the user, the desired target of the user can be selected accurately. Since a range can be specified roughly in accordance with the line-of-sight of the user, only a small movement amount/touch operation amount is required to make fine adjustments, and therefore the target can be selected quickly. As a result, the user can specify the desired position (target) quickly and accurately.

Modified example 2 is based on the presumption that a single target is specified as the attack target, but it is also possible to specify a plurality of targets in one go. For example, when an operation having a confirmation function is performed at the point where the line-of-sight pointer 1410 is displayed as shown in FIG. 14B, all of the targets in the range of the line-of-sight pointer 1410 may be selected rather than selecting a target individually from the range of the line-of-sight pointer 1410. In other words, the plurality of targets 1401-1403 may be selected rather than the single target 1401. Here, the operation having a confirmation function may be a different operation, such as an operation on an enter button, to the line-of-sight confirmation operation. Note that the line-of-sight pointer 1410 may also be considered as an item indicating a range in which a plurality of targets, among the targets displayed on the display unit, can be included.

Further, the display forms of the target frame 1411, the touch pointer 1412, and the target frame 1413 are not limited to the displays shown in FIGS. 14A to 14F, and these elements may be displayed as desired as long as it is possible to visually recognize that the target 1401 or the target 1402 has been selected and that a pointer operation can currently be performed by means of a touch operation. For example, the target 1401 and the target 1402 may be displayed such that the silhouettes thereof are highlighted, the frame displays may be caused to flash, or the frame displays may be displayed in a different color to the line-of-sight pointer 1410. The touch pointer 1412 is not limited to a circular frame display and may be displayed as a circle with a filled-in interior, as a rectangular frame rather than a circle, similarly to the line-of-sight pointer 1410 and the target frame 1411, or in a different display color to the line-of-sight pointer 1410 and the target frame 1411. Note that the touch pointer 1412 may also be considered as an item indicating a range in which a plurality of targets, among the targets displayed on the display unit, can be included.

Furthermore, in the above embodiment, a case in which the present invention is applied to a digital camera was described as an example, but the present invention is not limited to this example and may be applied to any electronic device capable of specifying a position by means of line-of-sight input and an operation on an operating member. More specifically, the present invention may be applied to a personal computer, a PDA, a mobile telephone terminal, a mobile image viewer, a head-mounted display, or the like. The present invention may also be applied to a digital photo frame, a music player, a game device, an electronic book reader, a tablet terminal, a smartphone, a projection device, a household appliance or an in-vehicle device having a display, and so on. For example, the present invention may be applied in a form in which characters are input one at a time by performing key operation on a soft keyboard of a PC, and when input is performed by line-of-sight, a desired subject is selected from a plurality of word candidates.

The present invention is realized by executing the following processing. Software (a program) for realizing the functions of the above embodiment is supplied to a system or a device via a network or various storage media, and a computer (or a CPU, an MPU, or the like) of the system or the device reads and executes the program code. In this case, the program and the storage medium storing the program constitute the present invention.

Note that the various types of control described above, which are described as being performed by a CPU, may be performed by a single piece of hardware, or control of the overall device may be performed by apportioning the processing among a plurality of pieces of hardware.

According to the present invention, when a position is specified using the line-of-sight input of a user, the position intended by the user can easily be specified.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

The present invention is not limited to the embodiment described above, and various modifications and amendments may be implemented thereon without departing from the spirit and scope of the present invention. Accordingly, the following claims are attached in order to publicize the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic imaging device comprising an electronic viewfinder as a display unit, at least one memory and at least one processor which function as:
    a reception unit configured to receive line-of-sight input corresponding to a line-of-sight of a user looking at the display unit; and
    a control unit configured to perform control to move a selected position on the display unit in response to the line-of-sight input or a first operation to an operation unit, wherein the control unit performs control such that
    in a first case, in which the selected position is specified on a basis of the line-of-sight input but the first operation is not performed to the operation unit, a first item indicating a range of a first size is displayed in the selected position based on the line-of-sight input,
    in a second case, in which the selected position is specified on a basis of the line-of-sight input and the first operation is performed to the operation unit, a second item indicating a range of a second size, which is smaller than the first size, is displayed in the selected position, in the first case, an object is selected in a position of the first item in response to a second operation, which is different from the first operation, on a basis of an automatic selection condition, and in the second case, an object is selected in a position of the second item in response to the second operation without being on a basis of the automatic selection condition.

2. The electronic device according to claim 1, wherein the control unit further executes AF processing to the selected object.

3. The electronic device according to claim 2, wherein
the control unit is switchable between a first AF mode, in which a focus position is fixed after the AF processing is executed, and a second AF mode, in which AF is executed continuously, and in the first case in the second AF mode, the control unit performs control to display a third item indicating a range of a third size, which is larger than the first size, in the selected position based on the line-of-sight input.

4. The electronic device according to claim 1, wherein the control unit does not display the first item in the second case.

5. The electronic device according to claim 1, wherein
the second operation is an operation to an operation unit different from a shutter button, the operation unit being disposed in a position that allows operation of the shutter button in a state where a grip portion of the electronic device is held, and a position that allows operation thereof by a finger of a hand holding the grip portion.

6. The electronic device according to claim 1, wherein the second operation is an operation for issuing an imaging instruction.

7. An electronic imaging device comprising an electronic viewfinder as a display unit, at least one memory and at least one processor which function as:

a reception unit configured to receive line-of-sight input corresponding to a line-of-sight of a user looking at the display unit; and a control unit configured to perform control to move a selected position on the display unit in response to the line-of-sight input or a first operation to an operation unit, wherein the control unit performs control such that in a first case, in which the selected position is specified on a basis of the line-of-sight input but the first operation is not performed to the operation unit, a first item indicating a range of a first size is displayed in the selected position based on the line-of-sight input, and in a second case, in which the selected position is specified on a basis of the line-of-sight input and the first operation is performed to the operation unit, a second item indicating a range of a second size, which is smaller than the first size, is displayed in the selected position, and the first item is not displayed.

8. The electronic device according to claim 1, wherein the control unit performs control such that in a case where a movement instruction operation is performed to the operation unit in a state where the second item is displayed, a display position of the second item is moved in response to the movement instruction operation, not on a basis of the line-of-sight input after displaying the second item.

9. The electronic device according to claim 1, wherein the operation unit is a touch operation member, and the first operation is a touch operation to the touch operation member.

10. The electronic device according to claim 9, wherein, in the second case, the control unit performs control such that the second item is displayed in the selected position based on the touch operation.

11. The electronic device according to claim 1, wherein, in the second case, the control unit performs control such that the second item is displayed in the selected position, based on the line-of-sight input at a point in time when the first operation is performed.

12. The electronic device according to claim 1, wherein the operation unit is a detection unit configured to detect a movement operation involving moving an operating body, and the first operation is the movement operation to the detection unit.

13. The electronic device according to claim 1, wherein the first item is an item indicating a range which is capable of including a plurality of targets, among targets displayed on the display unit.

14. The electronic device according to claim 1, wherein the second item is an item indicating a range which is capable of including a single target, among targets displayed on the display unit.

15. A control method for an electronic imaging device comprising an electronic viewfinder as a display unit, the method comprising:

a reception step for receiving line-of-sight input corresponding to a line-of-sight of a user looking at the display unit; and a control step for performing control to move a selected position on the display unit in response to the line-of-sight input or a first operation to an operation unit, wherein, in the control step, control is performed such that in a first case, in which the selected position is specified on a basis of the line-of-sight input but the first operation is not performed to the operation unit, a first item indicating a range of a first size is displayed in the selected position based on the line-of-sight input, in a second case, in which the selected position is specified on a basis of the line-of-sight input and the first operation is performed to the operation unit, a second item indicating a range of a second size, which is smaller than the first size, is displayed in the selected position, in the first case, an object is selected in a position of the first item in response to a second operation, which is different from the first operation, on a basis of an automatic selection condition, and in the second case, an object is selected in a position of the second item in response to the second operation without being on a basis of the automatic selection condition.

16. A control method for an electronic imaging device comprising an electronic viewfinder as a display unit, the method comprising:

a reception step for receiving line-of-sight input corresponding to a line-of-sight of a user looking at the display unit; and a control step for performing control to move a selected position on the display unit in response to the line-of-sight input or a first operation to an operation unit, wherein, in the control step, control is performed such that in a first case, in which the selected position is specified on a basis of the line-of-sight input but the first operation is not performed to the operation unit, a first item indicating a range of a first size is displayed in the selected position based on the line-of-sight input, and in a second case, in which the selected position is specified on a basis of the line-of-sight input and the first operation is performed to the operation unit, a second item indicating a range of a second size, which is smaller than the first size, is displayed in the selected position, and the first item is not displayed.

17. A non-transitory computer readable storage medium that stores a program, wherein the program causes a computer to execute a control method for an electronic imaging device comprising an electronic viewfinder as a display unit, the control method comprising:

a reception step for receiving line-of-sight input corresponding to a line-of-sight of a user looking at the display unit; and a control step for performing control to move a selected position on the display unit in response to the line-of-sight input or a first operation to an operation unit, wherein, in the control step, control is performed such that in a first case, in which the selected position is specified on a basis of the line-of-sight input but the first operation is not performed to the operation unit, a first item indicating a range of a first size is displayed in the selected position based on the line-of-sight input, in a second case, in which the selected position is specified on a basis of the line-of-sight input and the first operation is performed to the operation unit, a second item indicating a range of a second size, which is smaller than the first size, is displayed in the selected position, in the first case, an object is selected in a position of the first item in response to a second operation, which is different from the first operation, on a basis of an automatic selection condition, and in the second case, an object is selected in a position of the second item in response to the second operation without being on a basis of the automatic selection condition.

18. A non-transitory computer readable storage medium that stores a program, wherein the program causes a computer to execute a control method for an electronic imaging device comprising an electronic viewfinder as a display unit, the control method comprising:

a reception step for receiving line-of-sight input corresponding to a line-of-sight of a user looking at the display unit; and a control step for performing control to move a selected position on the display unit in response to the line-of-sight input or a first operation to an operation unit, wherein, in the control step, control is performed such that in a first case, in which the selected position is specified on a basis of the line-of-sight input but the first operation is not performed to the operation unit, a first item indicating a range of a first size is displayed in the selected position based on the line-of-sight input, and in a second case, in which the selected position is specified on a basis of the line-of-sight input and the first operation is performed to the operation unit, a second item indicating a range of a second size, which is smaller than the first size, is displayed in the selected position, and the first item is not displayed.

\* \* \* \* \*